US012533783B2

(12) United States Patent
Furusawa et al.

(10) Patent No.: US 12,533,783 B2
(45) Date of Patent: Jan. 27, 2026

(54) HAMMER DRILL

(71) Applicant: MAKITA CORPORATION, Anjo (JP)

(72) Inventors: Masanori Furusawa, Anjo (JP); Hitoshi Iida, Anjo (JP); Kei Watanabe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/169,268

(22) Filed: Apr. 3, 2025

(65) Prior Publication Data

US 2025/0319580 A1 Oct. 16, 2025

(30) Foreign Application Priority Data

Apr. 15, 2024 (JP) ................................ 2024-065724
Apr. 15, 2024 (JP) ................................ 2024-065725

(51) Int. Cl.
*B25D 16/00* (2006.01)
*B25D 17/08* (2006.01)

(52) U.S. Cl.
CPC ......... *B25D 16/006* (2013.01); *B25D 17/084* (2013.01); *B25D 16/003* (2013.01); *B25D 2216/0084* (2013.01); *B25D 2250/045* (2013.01)

(58) Field of Classification Search
CPC .. B25D 16/006; B25D 17/084; B25D 16/003; B25D 2216/0084; B25D 2250/045; B25D 16/0015; B25D 16/0023; B25D 16/0038; B25D 2211/0046
USPC ... 173/48, 104, 201, 109, 47, 20, 162.2, 217
See application file for complete search history.

(56) References Cited

U.S. PATENT DOCUMENTS

2010/0236801 A1* 9/2010 Furusawa ............. B25D 11/10 173/162.2

FOREIGN PATENT DOCUMENTS

JP 2017154229 * 9/2017 ............ B25D 16/00
JP 6735118 B2 8/2020

* cited by examiner

*Primary Examiner* — Jacob A Smith
(74) *Attorney, Agent, or Firm* — Oliff PLC

(57) ABSTRACT

A hammer drill includes a motor, a cylindrical tool holder, an intermediate shaft, a rotation conversion portion, a mode switching member, a restricting member, and an operation member. A first switch state of the restricting member by the operation member causes a first operation mode in which rotation of the tool holder and a striking motion of a striking portion allowed to be performed simultaneously in conjunction with retreat of the tool holder. A second switch state of the restricting member by the operation member causes a second operation mode in which the retreat of the tool holder from the advance position is restricted and the tool holder is allowed to be rotated only. The restricting member is provided with a plurality of restricting portions that contact the mode switching member to restrict the retreat of the mode switching member.

14 Claims, 18 Drawing Sheets

HAMMER DRILL

CROSS REFERENCE TO RELATED APPLICATION

This application claims the benefit of Japanese Patent Application Numbers 2024-065724 and 2024-065725 filed on Apr. 15, 2024, the entirety of which is incorporated by reference.

FIELD OF THE INVENTION

The disclosure relates to a hammer drill that allows a user to select an operation mode according to a forward and rearward position of a tool holder holding a tip tool.

BACKGROUND OF THE INVENTION

It is known that a hammer drill includes a tool holder holding a tip tool at a front end and being movable forward and rearward in a strike axis line direction in which an operation mode can be selected according to a forward and rearward position of the tool holder.

For example, a hammer drill disclosed in JP 6735118 B includes a tool holder that houses a striking portion and is movable forward and rearward and is biased to protrude to an advance position. In addition, in the hammer drill, an intermediate shaft that transmits rotation of a motor is provided parallel to the tool holder. The intermediate shaft is provided with a gear that transmits rotation to the tool holder and a rotation conversion portion, namely a boss sleeve and a clutch, that converts the rotation of the intermediate shaft into operation of the striking portion. With the hammer drill, a drill mode can be selected by operating a mode switch lever to restrict retreat of the tool holder to a position where the clutch does not engage with the boss sleeve. In addition, the hammer drill mode can be selected by operating the mode switch lever to allow the retreat of the tool holder to a position where the clutch engages with the boss sleeve.

In the hammer drill, the retreat of the tool holder in the drill mode is restricted by engaging an eccentric pin on the mode switch lever with a plate externally mounted on the tool holder orthogonally from a side. However, the eccentric pin is a cantilever support structure that protrudes from the mode switch lever, which fits into a side surface of a housing. Therefore, when a rearward pushing force transmitted from the tip tool to the tool holder increases in a drill mode, the eccentric pin may deform or tilt. In this case, the retreat restriction position of the tool holder may not be stable, and the clutch that has retreated with the tool holder may engage with the boss sleeve, causing a striking motion to occur unexpectedly.

Therefore, an objective of the disclosure is to provide the hammer drill that includes the tool holder allowing selection of the operation mode according to the forward and rearward position of the tool holder and can improve reliability of a rotation-only mode by stabilizing the retreat restriction position of the tool holder even when the pushing force on the tool holder increases.

SUMMARY OF THE INVENTION

In order to achieve the above-described object, the disclosure provides a hammer drill including a motor, a cylindrical tool holder, an intermediate shaft, a rotation conversion portion, a mode switching member, a restricting member, and an operation member. The cylindrical tool holder is configured to hold a tip tool at a front end thereof, includes a striking portion of the tip tool housed therein, is movable forward and rearward and rotatable coaxially with a strike axis line of the striking portion, and is biased to protrude frontward. The intermediate shaft is arranged parallel to the tool holder. Rotation of the motor is transmitted to the intermediate shaft. The intermediate shaft transmits the rotation to the tool holder. The rotation conversion portion is disposed on the intermediate shaft and converts the rotation of the intermediate shaft into a striking motion of the striking portion. The mode switching member moves forward and rearward together with the tool holder, causes the rotation conversion portion to be inactive in an advance position of the tool holder, and causes the rotation conversion portion to be active in a retreated position of the tool holder. The restricting member is configured to restrict a retreat of the mode switching member in the advance position of the tool holder. The operation member is configured to switch the restricting member between a first switch state in which the restricting member does not restrict the retreat of the mode switching member and a second switch state in which the restricting member restricts the retreat of the mode switching member. In the hammer drill, the first switch state of the restricting member by the operation member causes the first operation mode in which the rotation of the tool holder and the striking motion of the striking portion allowed to be performed simultaneously in conjunction with the retreat of the tool holder to the retreated position. In the hammer drill, the second switch state of the restricting member by the operation member causes the second operation mode in which the retreat of the tool holder from the advance position is restricted and the tool holder is allowed to be rotated only.

The restricting member is arranged behind the mode switching member in a direction of the strike axis line, the restricting member is provided with a plurality of restricting portions that contact the mode switching member to restrict the retreat of the mode switching member, and at least one of the plurality of restricting portions is positioned in each of two regions mutually opposed with respect to the strike axis line.

According to the disclosure, in the second operation mode, the mode switching member can be supported in a well-balanced manner by the plurality of restricting portions provided on the restricting member, and the retreat of the tool holder can be restricted. Therefore, even when the pushing force on the tool holder increases, the retreat restriction position of the tool holder can be stabilized, and the reliability in the second operation mode can be improved.

DETAILED DESCRIPTION OF THE INVENTION

Figure 1:
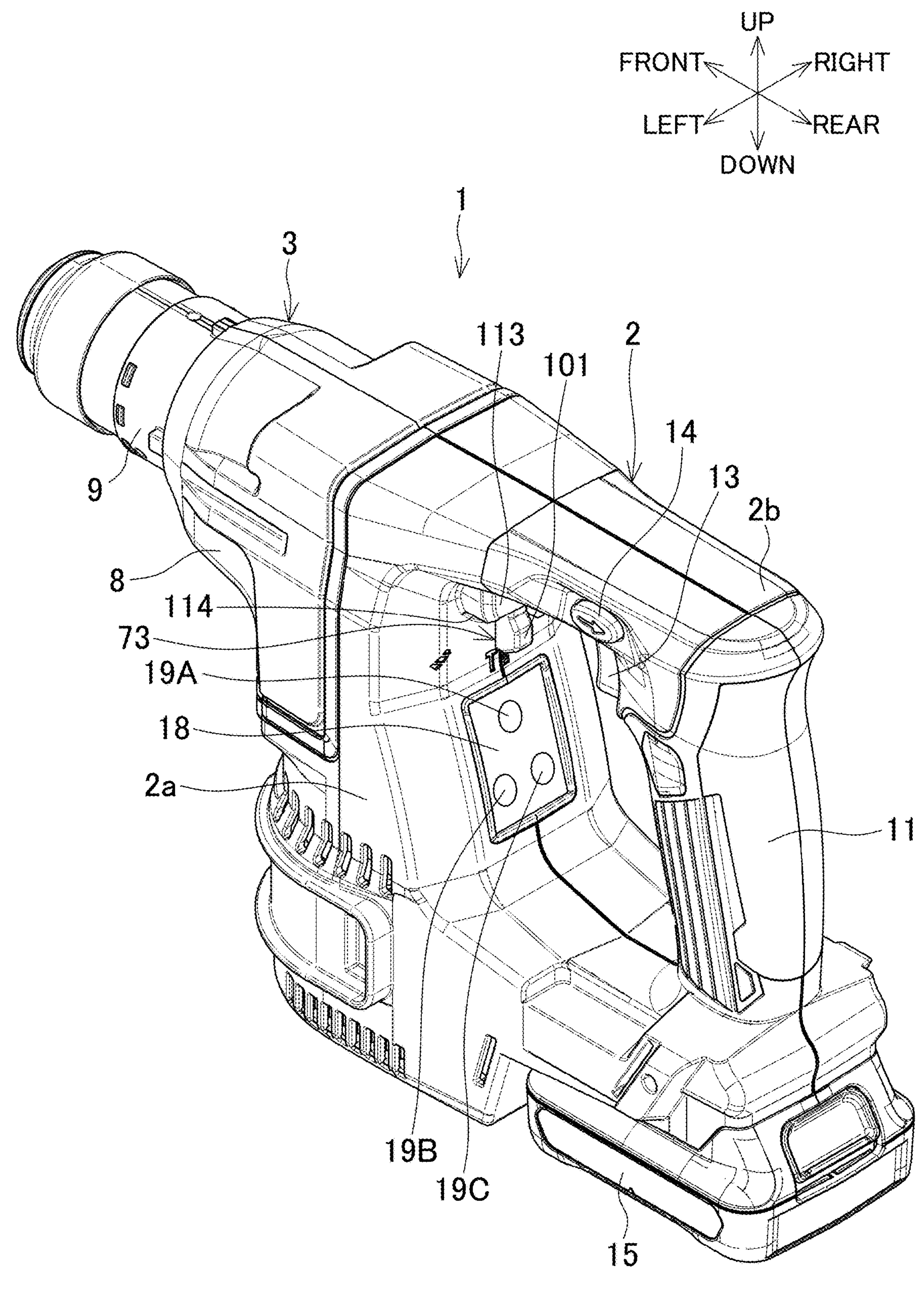
FIG. 1 is a perspective view of a hammer drill viewed from rear in a hammer drill mode.

In one embodiment of the disclosure, two restricting portions may be provided on left and right of a strike axis line.

According to the configuration, a retreat restriction position of a tool holder can be stabilized with the minimum restricting portions.

In one embodiment of the disclosure, the restricting member may be movable forward and rearward in the strike axis line direction, may retreat in conjunction with a retreat of a mode switching member in a first switch state, and may move forward to restrict a retreat of the mode switching member in a second switch state.

According to the configuration, even when the restricting member is provided behind the tool holder, the restricting member will not interfere with use in the first operation mode.

In one embodiment of the disclosure, a cam mechanism may be provided that allows the restricting member to retreat in the first switch state and moves the restricting member forward in the second switch state.

According to the configuration, a switch of the forward and rearward movement of the restricting member can be easily performed in a space-saving manner.

In one embodiment of the disclosure, the cam mechanism may include a biasing member that biases the tool holder forward.

According to the configuration, the tool holder can protrude to an advance position using the biasing member provided in the cam mechanism.

In one embodiment of the disclosure, the cam mechanism may include a front cam that is arranged behind the restricting member and is movable forward and rearward, and a rear cam that is arranged behind the front cam and changes a posture thereof between a first posture that allows the front cam to retreat in response to operation of the operation member and a second posture that restricts the front cam from retreating at the front.

The biasing member may be a conical spring provided between the front cam and the rear cam and that biases the restricting member and the mode switching member forward together with the front cam.

According to the configuration, a biasing force can be applied without loss in the strike axis line direction by the conical spring that is unlikely to buckle.

In one embodiment of the disclosure, the restricting member, the cam mechanism, and the operation member may be arranged on the strike axis line.

According to the configuration, the tool holder and the mode switching member can be moved smoothly forward and rearward on the strike axis line to switch the modes.

In one embodiment of the disclosure, the restricting member may be provided with a strike protection member that suppresses the rotation conversion portion from operating in the second operation mode.

According to the configuration, it is possible to effectively suppress unexpected striking motions in the second operation mode.

In one embodiment of the disclosure, the striking portion may include a piston cylinder housed in the tool holder from rear and allowed to move forward and rearward, and a striking member housed in the piston cylinder and linked to the forward and rearward movement of the piston cylinder.

The rotation conversion portion may include a conversion member that is externally mounted on the intermediate shaft and which the mode switching member engages with and detached from, and a rod that is connected to a rear end of the piston cylinder and oscillates forward and rearward in conjunction with the rotation of the conversion member.

The strike protection member may contact the rear end of the piston cylinder, which has retreated together with the rod, and restrict the oscillation of the rod.

According to the configuration, the restriction of oscillation of the rod of the rotation conversion portion makes it easy to suppress unexpected striking motions in the second operation mode.

In one embodiment of the disclosure, the strike protection member may be integrally molded with the restricting member.

According to the configuration, the strike protection member can be reliably arranged behind the piston cylinder using the restricting member.

The following describes embodiments of the disclosure based on the drawings.

Figure 2:
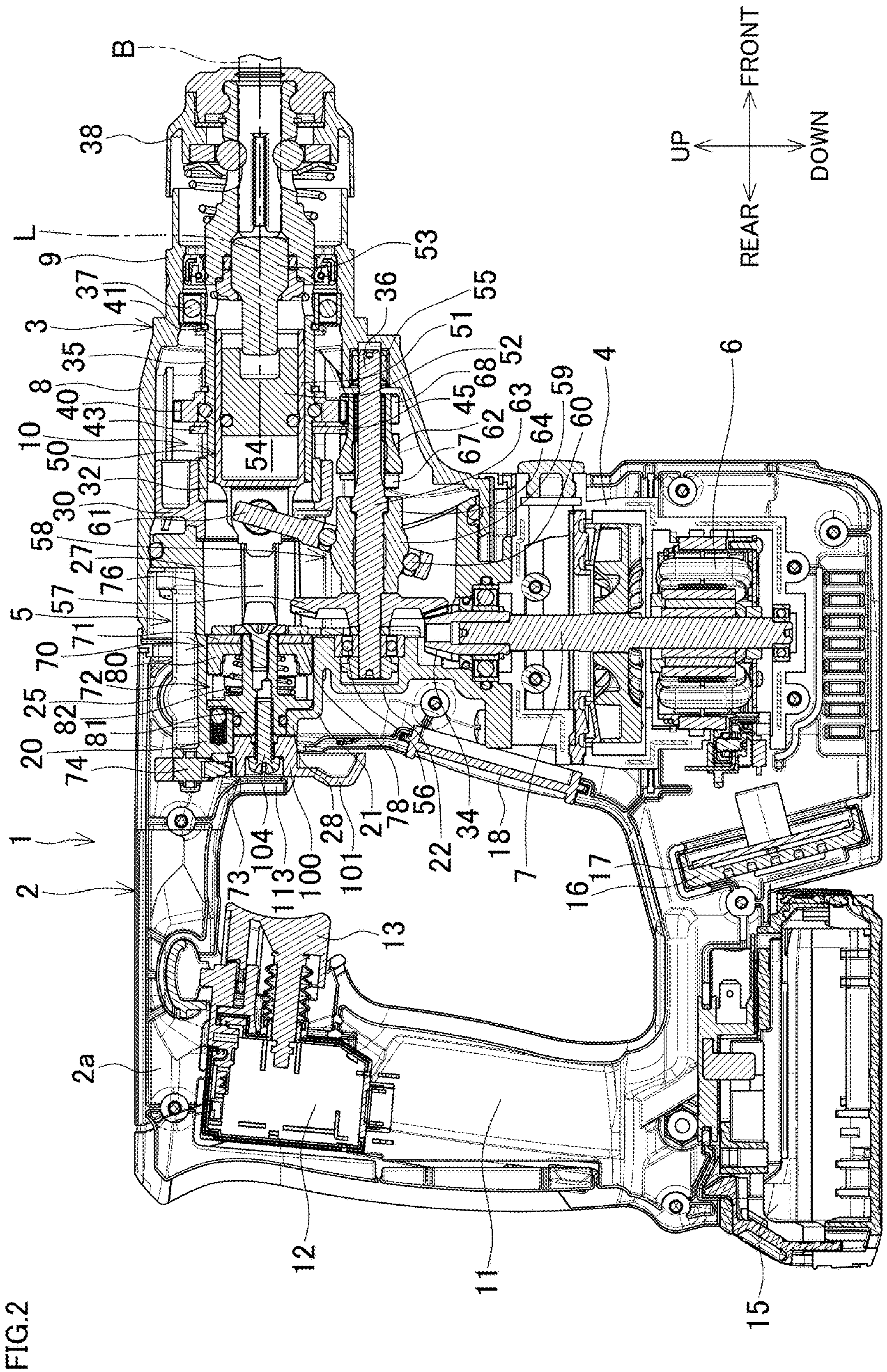
FIG. 2 is a central longitudinal cross-sectional view of the hammer drill in the hammer drill mode.
Figure 3:
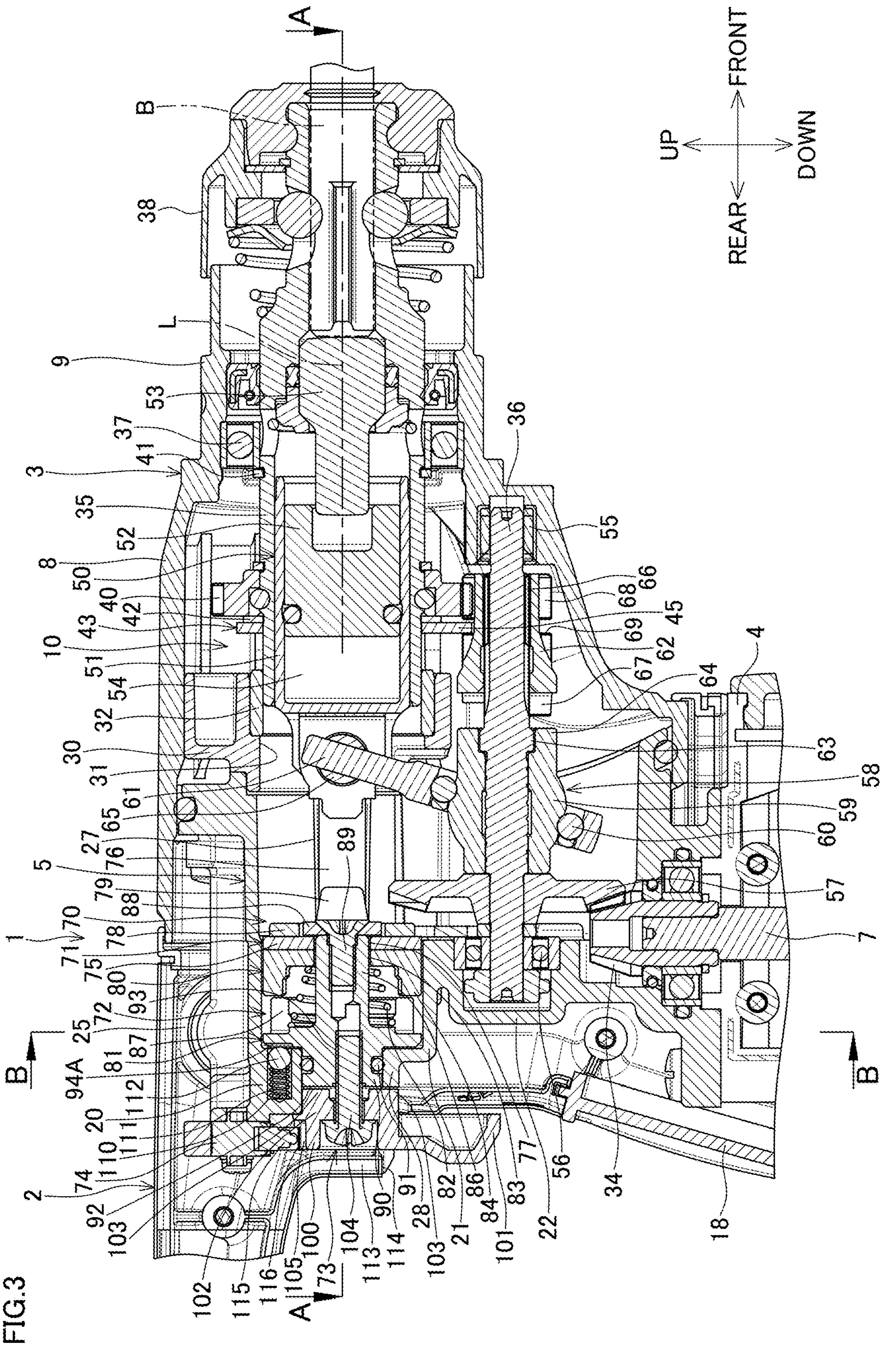
FIG. 3 is an enlarged view of a rotation and strike mechanism in FIG. 2.
Figure 4:
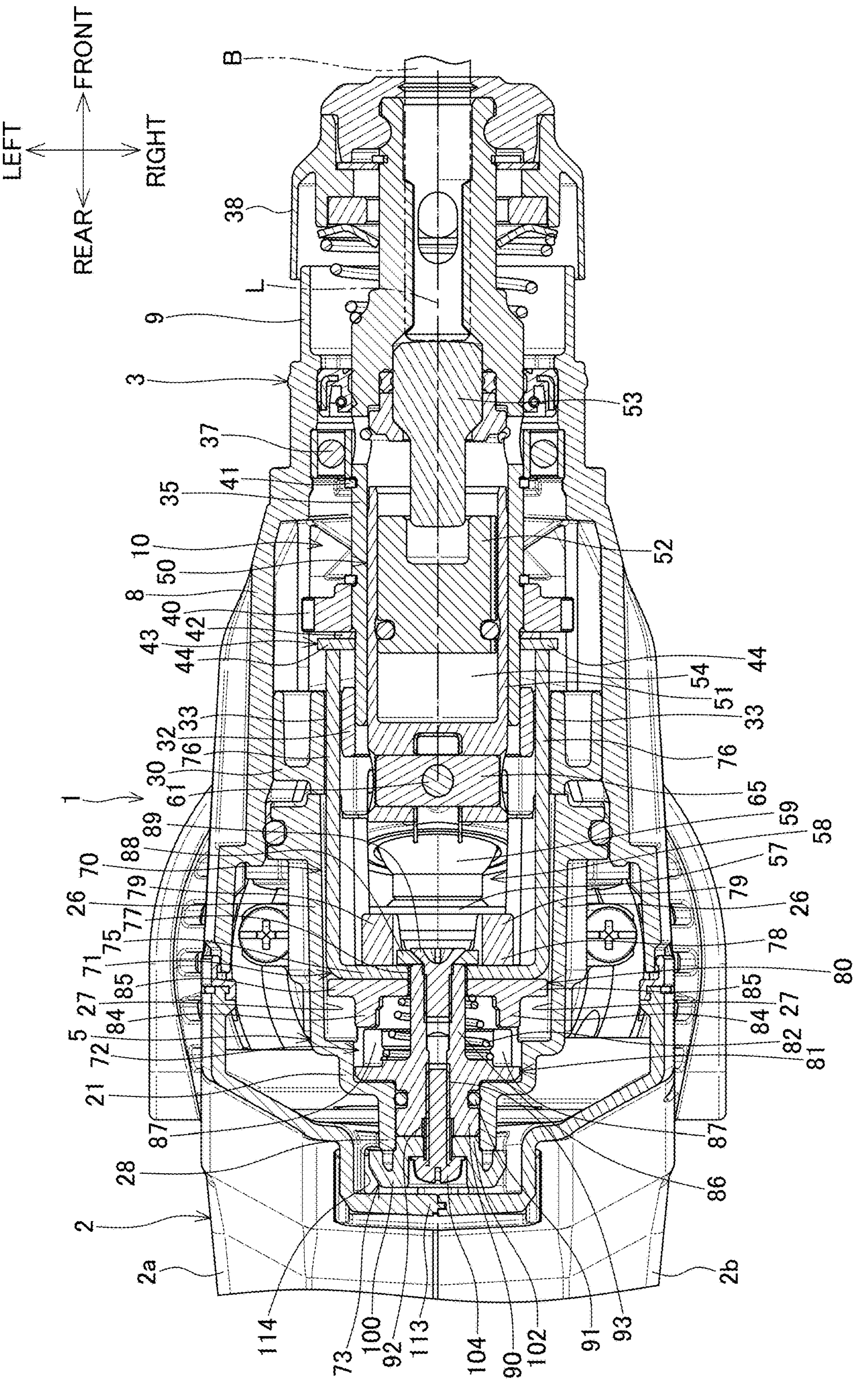
FIG. 4 is a cross-sectional view taken along line A-A in FIG. 3.

FIG. 1 is a perspective view illustrating one example of a hammer drill viewed from rear. FIG. 2 is a central longitudinal cross-sectional view of the hammer drill. FIG. 3 is an enlarged view of a portion of a rotation and strike mechanism in FIG. 2. FIG. 4 is a cross-sectional view taken along line A-A in FIG. 3. All of these are in a hammer drill mode.

A hammer drill 1 includes a body housing 2 and a front housing 3 as a housing forming an outer housing. The body housing 2 is formed by screwing together left and right half housings 2*a*, 2*b*. The front housing 3 is coupled to a front upper portion of the body housing 2.

The body housing 2 houses the motor housing 4 in a front lower portion thereof. The body housing 2 is arranged across a front upper portion and the front housing 3 to house an inner housing 5. The motor 6 is held in a motor housing 4 in a posture with a rotation shaft 7 facing upward. The inner housing 5 is screwed to the motor housing 4.

The front housing 3 includes a rear cylinder portion 8 and a front cylinder portion 9. The rear cylinder portion 8 is screwed to the inner housing 5. The rear cylinder portion 8 widens as it extends rearwards, and is screwed to the inner housing 5 and coupled to a front upper portion of the body housing 2. The front cylinder portion 9 is integrally formed on a front side of the rear cylinder portion 8. A side handle, not illustrated, can be mounted to a base of the front cylinder portion 9. A rotation and strike mechanism 10 is housed in the inner housing 5 and the front housing 3.

A grip portion 11 is formed in an upper and lower direction at a rear portion of the body housing 2. The grip portion 11 is looped at upper and lower ends and connects to the body housing 2. A switch 12 is housed in an upper portion of the grip portion 11. The switch 12 includes a trigger 13 that protrudes forward. A forward and reverse switch button 14 disposed above the trigger 13 is provided for switching rotation of a motor 6. A battery pack 15 as a power source is detachably mounted in a lower rear side of the body housing 2 below the grip portion 11.

A controller 16 is housed between the motor 6 and the battery pack 15. The controller 16 includes a control circuit board 17. The control circuit board 17 includes a motor control circuit and a power supply circuit in which elements such as the well-known CPU, RAM, and ROM are mounted. An operation panel 18 is provided above the controller 16 on a front inner peripheral surface of the loop-shaped portion. The operation panel 18 includes three buttons 19A to 19C. The upper button 19A corresponds to a hammer drill mode, the lower left button 19B corresponds to a drill mode, and the lower right button 19C corresponds to a clutch mode.

Figure 5:
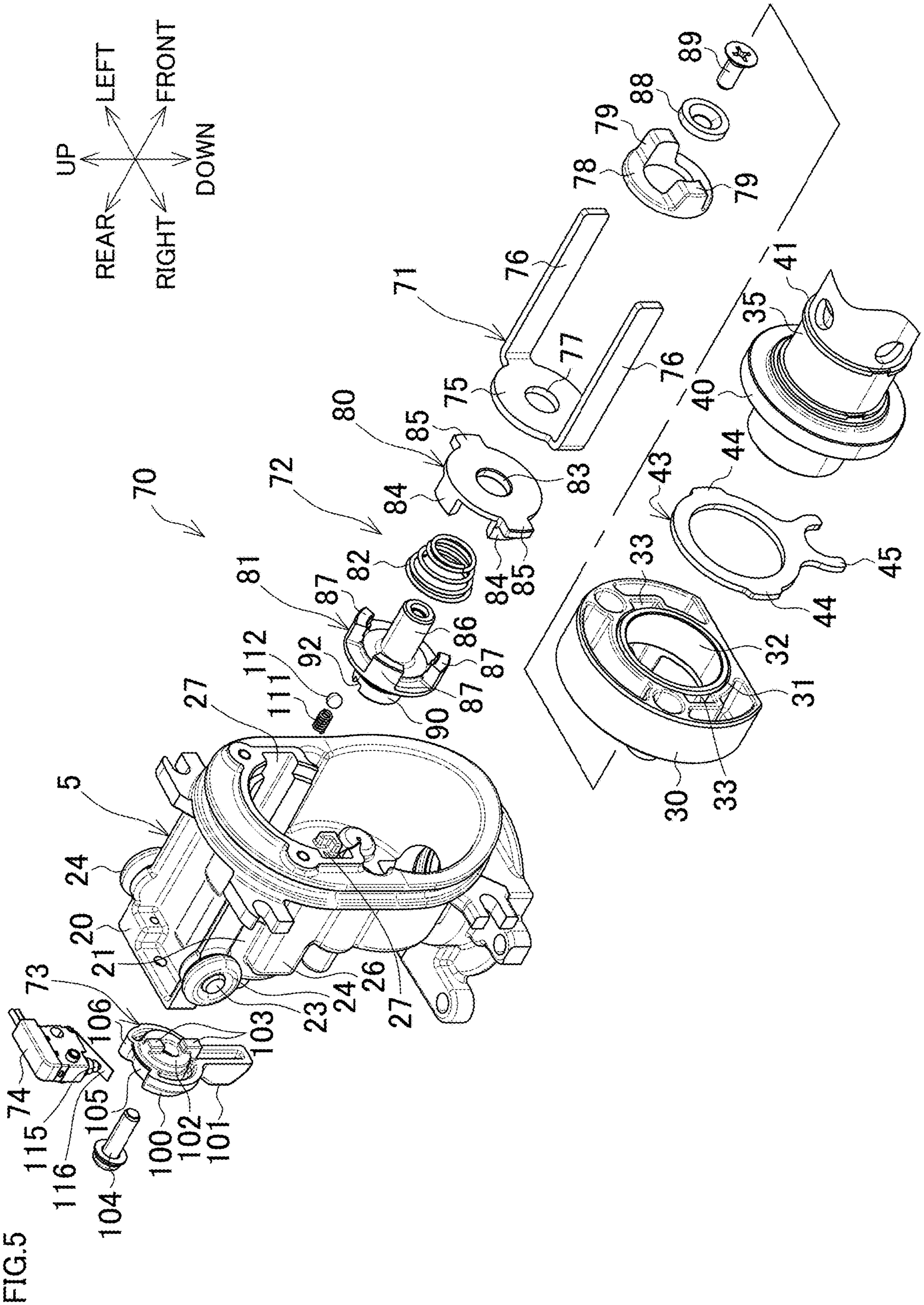
FIG. 5 is an exploded perspective view of a mode switching portion viewed from front.
Figure 6:
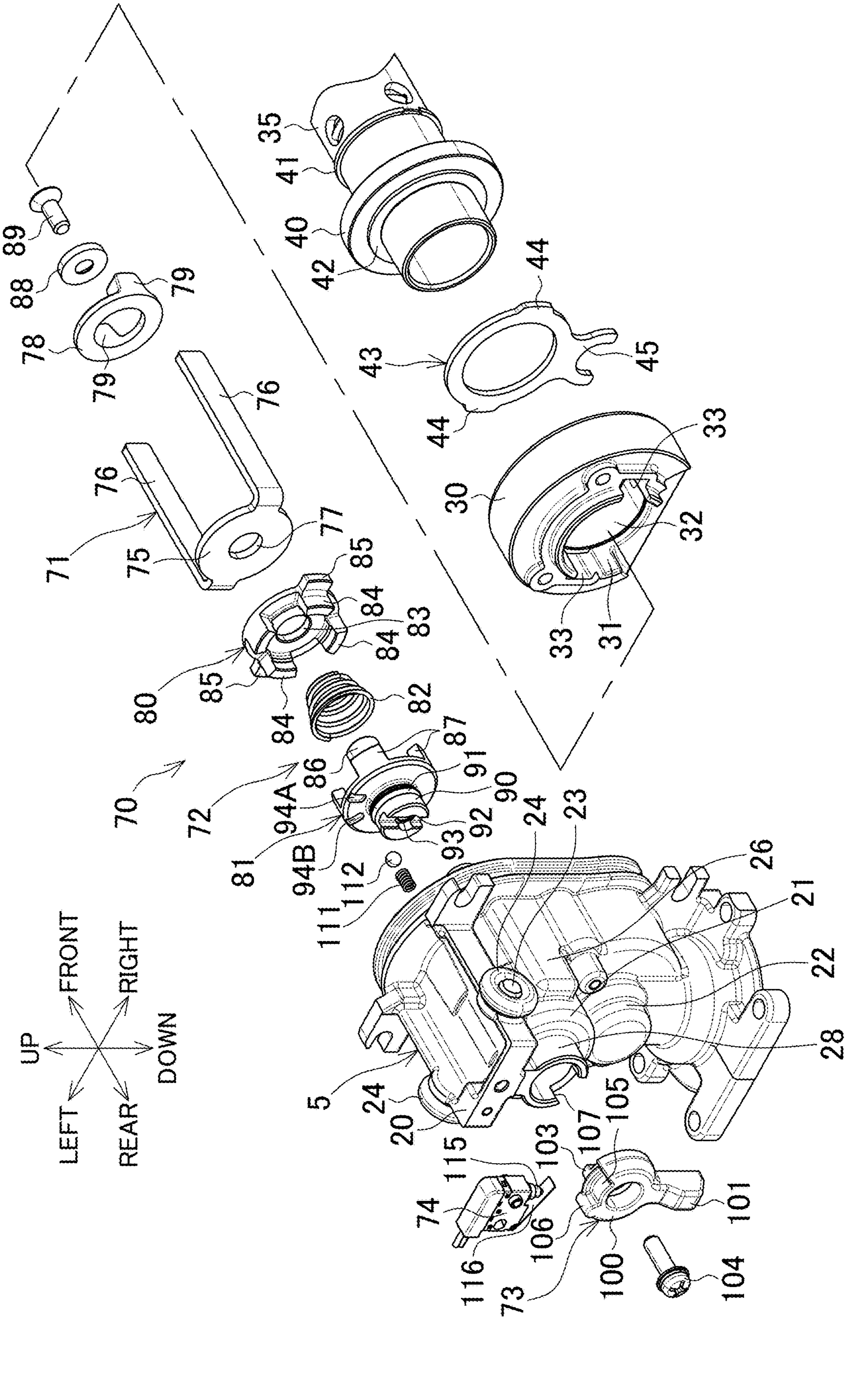
FIG. 6 is an exploded perspective view of the mode switching portion viewed from rear.
Figure 7:
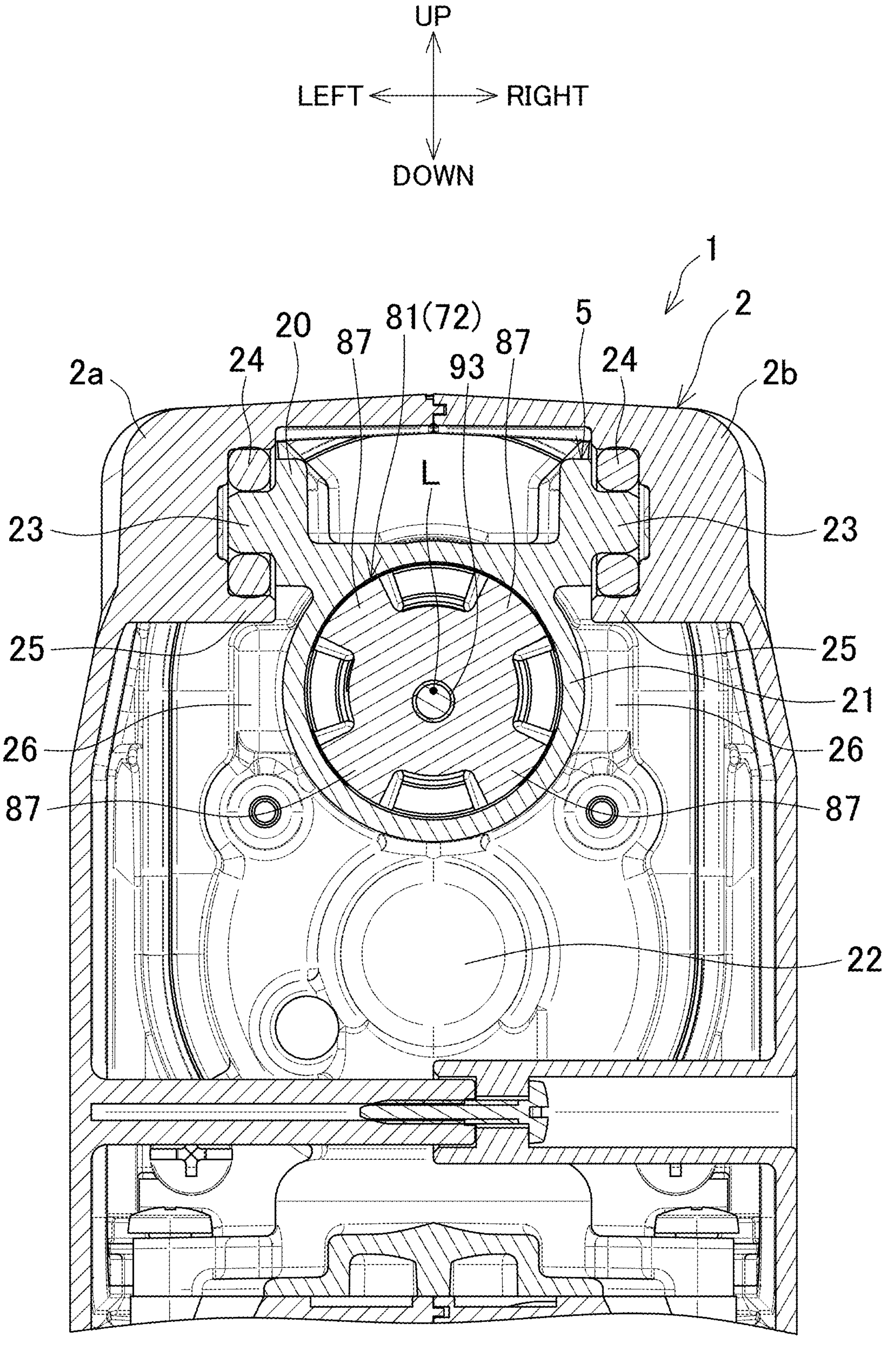
FIG. 7 is a cross-sectional view taken along line B-B in FIG. 3.

The inner housing 5 has an elliptical shape in front view that extends in an upper and lower direction with an open front surface as illustrated in FIGS. 5 and 6. The inner housing 5 includes an upper plate portion 20, a middle cylinder portion 21, and a lower cylinder portion 22. The upper plate portion 20 has a rectangular dish shape in plan view that extends in the front-rear direction in an upper portion of the inner housing 5. On left and right of a rear portion of the upper plate portion 20, support pins 23 are formed to protrude to the left and right outsides. Each rubber ring 24 is externally mounted on each support pin 23. As illustrated in FIG. 7, each rubber ring 24 is held by a boss 25 that protrudes from the inner surfaces of the left and right half housings 2*a*, 2*b* towards the center. Therefore, an upper portion of the inner housing 5 is elastically held in the body housing 2 via the rubber rings 24.

The middle cylinder portion 21 extends in the front-rear direction below the upper plate portion 20. As also illustrated in FIG. 4, on the left and right of the middle cylinder portion 21, protruding portions 26 are formed to extend forward and extend outward to the left and right. A guide recess 27 with an open front end is formed in each of the protruding portions 26. A rear portion of the middle cylinder portion 21 is a small diameter portion 28 with a smaller outer diameter than the front portion.

An inner support 30 is screwed to a front side of the middle cylinder portion 21 from the front. The inner support 30 has a short cylindrical shape with a center hole 31 coaxially with the middle cylinder portion 21. The center hole 31 includes a two-stage diameter with the front portion having a diameter larger than a diameter of the rear portion. A metal bearing 32 is press-fitted and held in a front portion of the center hole 31. On the left and right inner surfaces of the center hole 31, respective guide grooves 33 are formed to pass in the front-rear direction outside the metal bearing 32. The guide grooves 33 are continuous with the guide recesses 27 provided in the middle cylinder portion 21.

The lower cylinder portion 22 is a cylindrical portion positioned below the middle cylinder portion 21 and has a bottom and an opening forward. An upper end of the rotation shaft 7 of the motor 6 passes through an upper portion of the motor housing 4 and a lower portion of the inner housing 5. On the upper end of the rotation shaft 7, a first gear 34 is provided to protrude into the inner housing 5 below the lower cylinder portion 22.

The rotation and strike mechanism 10 includes a tool holder 35 and an intermediate shaft 36.

The tool holder 35 is held by the metal bearing 32 of the inner support 30 and a bearing 37, which is held by the front cylinder portion 9 of the front housing 3. The tool holder 35 is rotatable and movable forward and rearward in a direction in which an axis line as a strike axis line L is in the front-rear direction. A front end of the tool holder 35 protrudes forward from the front cylinder portion 9. An operating sleeve 38 for attaching and detaching a bit B is provided at the front end of the tool holder 35. The bit B is one example of a tip tool of the disclosure.

A fourth gear 40 is integrally, externally, and rotatably mounted on a rear outer circumference of the tool holder 35. A stopper ring 41 is fixed between the fourth gear 40 and the bearing 37 on the outer circumference of the tool holder 35. Advance of the tool holder 35 is restricted in a position illustrated in FIGS. 2 to 4, where the stopper ring 41 contacts an inner ring of the bearing 37. A washer 42 and a change plate 43 are externally mounted between the fourth gear 40 and the metal bearing 32 on the outer circumference of the tool holder 35. As illustrated FIGS. 5 and 6, the change plate 43 is a ring-shaped plate with respective outward-facing receiving portions 44 formed on both the left and right sides. On a lower portion of the change plate 43, a semicircular engagement portion 45 is formed to widen downward. The tool holder 35 is restricted from retreating in a position where the change plate 43 is in contact with the metal bearing 32. The change plate 43 is one example of a mode switching member of the disclosure.

A striking portion 50 is provided inside the tool holder 35. The striking portion 50 includes a piston cylinder 51, a striker 52, and an impact bolt 53. The piston cylinder 51 is a cylindrical portion with an open end at the front, and is housed in the tool holder 35 from the rear side so as to be movable forward and rearward on the strike axis line L. The striker 52 is housed in the piston cylinder 51 in the movable forward and rearward manner on the strike axis line L via an air chamber 54. The striker 52 is one example of a striking member of the disclosure.

The impact bolt 53 is housed in the movable forward and rearward manner on the strike axis line L in front of the striker 52. The impact bolt 53 is capable of contacting the rear end of the bit B inserted in the front end of the tool holder 35.

The intermediate shaft 36 is arranged parallel to the strike axis line L below the tool holder 35. A front end of the intermediate shaft 36 is supported by a front bearing 55 provided in the rear cylinder portion 8 of the front housing 3. A rear end of the intermediate shaft 36 is supported by a rear bearing 56 provided in the lower cylinder portion 22 of the inner housing 5. A second gear 57 is fixed to a rear portion of the intermediate shaft 36 in front of the rear bearing 56. The second gear 57 meshes with the first gear 34 provided on the rotation shaft 7. Therefore, the intermediate shaft 36 rotates at a reduced speed via the first gear 34 and the second gear 57 due to rotation of the rotation shaft 7 driven by the motor 6.

A rotation conversion portion 58 is provided on the intermediate shaft 36 in front of the second gear 57. The rotation conversion portion 58 includes a boss sleeve 59, a swash bearing 60, a rod 61, and a clutch gear 62. The boss sleeve 59 is rotatably and externally mounted on the intermediate shaft 36 between a stopper 63 provided in a middle portion of the intermediate shaft 36 and the second gear 57. A boss side engagement portion 64 is provided on a front surface of the boss sleeve 59. The boss sleeve 59 is one example of a conversion member of the disclosure.

The swash bearing 60 is provided on an outer circumference of the boss sleeve 59 and is inclined from the axis line of the boss sleeve 59. The rod 61 is disposed to protrude radially upward from an outer ring of the swash bearing 60. A tip of the rod 61 is connected to a rear end of the piston cylinder 51 via a connecting pin 65.

The clutch gear 62 is externally mounted on a spline portion 66 formed on the intermediate shaft 36 in front of the stopper 63. The clutch gear 62 is slidably coupled to the intermediate shaft 36 in an axial direction such that the clutch gear 62 is rotatable integrally with respect to the intermediate shaft 36. On a rear surface of the clutch gear 62, a gear side engagement portion 67 is disposed to protrude rearward. The gear side engagement portion 67 engages with the boss side engagement portion 64 of the boss sleeve 59 in a direction of rotation in a retreated position of the clutch gear 62. A third gear 68 is formed on a front portion of the clutch gear 62. The third gear 68 meshes with the fourth gear 40 provided on the tool holder 35. An engagement groove 69 is formed circumferentially in a middle portion of the third gear 68. The engagement portion 45 of the change plate 43 engages with the engagement groove 69 from above. Therefore, the clutch gear 62 moves forward and rearward in accordance with the forward and rearward movement of the change plate 43. In the advance position of the change plate 43, the clutch gear 62 moves to a front position where the gear side engagement portion 67 is separated from the boss side engagement portion 64. In the retreated position of the change plate 43, the clutch gear 62 moves to a rear position where the gear side engagement portion 67 engages with the boss side engagement portion 64.

A mode switching portion 70 is provided on the middle cylinder portion 21 of the inner housing 5 at a rear of the tool holder 35. The mode switching portion 70 includes a restricting plate 71, a cam mechanism 72, an operation lever 73, and a mode-detection switch 74.

The restricting plate 71 includes a base end portion 75 and a pair of restricting portions 76. The base end portion 75 is a circular plate in front view, and a through hole 77 is formed in the center, which is concentric with the strike axis line L. The restricting plate 71 is one example of a restricting member of the disclosure.

A rubber plate 78 is provided coaxially on a front surface of the base end portion 75. The rubber plate 78 is integrally molded with the base end portion 75 of the iron-made restricting plate 71. The rubber plate 78 is a ring plate with a slightly smaller diameter than the base end portion 75, and its center hole includes a larger diameter than the through hole 77 in the base end portion 75. On the front left and right of the rubber plate 78, a pair of forward-protruding stopper portions 79 are provided. The rubber plate 78 is one example of a strike protection member of the disclosure.

The restricting portions 76 are strip-shaped plates that extend to the respective left and right outer sides from both the left and right sides of the base end portion 75 and then protrude forward in parallel. The restricting portions 76 are arranged symmetrically on the left and right such that each one is positioned in each of the left and right regions opposed one another with respect to the strike axis line L. The restricting portions 76 are one example of the restricting portions provided in the disclosure, at least one of which is positioned in each of two regions opposed one another with respect to the strike axis line L.

The restricting portions 76 fit into the guide recesses 27 on the left and right sides of the middle cylinder portion 21 and extend forward. Front portions of the restricting portions 76 pass through the respective guide grooves 33 on the left and right of the inner support 30. Therefore, the restricting plate 71 is held in a state where the rotation is restricted in the middle cylinder portion 21 and the inner support 30, and is movable forward and rearward in the direction of the strike axis line L. The receiving portions 44 of the change plate 43 are positioned in front of the restricting portions 76 passing through the guide grooves 33 of the inner support 30.

The cam mechanism 72 includes a front cam 80, a rear cam 81, and a conical spring 82, each of which is concentric with the strike axis line L.

The front cam 80 has a disc-shape with a diameter approximately the same as the base end portion 75 of the restricting plate 71, and includes a through-hole 83 formed in its center. On a rear surface of the front cam 80, four front cam claws 84 are disposed to protrude rearward at upper, lower, left, and right positions. On the left and right of the front cam 80, a pair of engagement pieces 85 are formed to protrude to the left and right outer sides. The engagement pieces 85 engage with the guide recesses 27 on the left and right of the middle cylinder portion 21. Therefore, the front cam 80 is held in a state where the rotation of the front cam 80 is restricted and is movable forward and rearward in the direction of the strike axis line L in the middle cylinder portion 21 by the guide recesses 27.

The rear cam 81 is rotatably housed in the middle cylinder portion 21 behind the front cam 80. The rear cam 81 has a disc-shape of the same diameter as the front cam 80, and includes a front shaft 86 protruding forward at its center. The front shaft 86 passes through the through-hole 83 of the front cam 80 and the through hole 77 of the base end portion 75 of the restricting plate 71. On a front surface of the rear cam 81 around the front shaft 86, four rear cam claws 87 are disposed to protrude forward at equal intervals in a circumferential direction. On a front surface of the base end portion 75 through which the front shaft 86 passes, a receiving washer 88 is provided to contact a front surface of the front shaft 86 in the center hole of the rubber plate 78. The receiving washer 88 is larger than the front shaft 86 in diameter, and is fixed orthogonally to the front shaft 86 by a countersunk screw 89 that is screwed into the front shaft 86 from the front passing through the receiving washer 88. The receiving washer 88 suppresses the base end portion 75 and the front cam 80 from moving forward and prevents them coming off the front shaft 86.

On a rear surface of the rear cam 81, a rear shaft 90, which is inserted into the small diameter portion 28 of the middle cylinder portion 21, is formed coaxially with the small diameter portion 28. An O-ring 91 is externally mounted on the rear shaft 90 to seal a space between the rear shaft 90 and the small diameter portion 28. On a rear surface of the rear shaft 90, a fitting groove 92 extending in a diameter direction is formed. The fitting groove 92 is positioned between the rear cam claws 87 that are adjacent to one another in a circumferential direction when viewed from the rear. A screw hole 93 extending in the forward direction is formed in the fitting groove 92. The screw hole 93 is provided in an eccentric position slightly below the strike axis line L as illustrated in FIG. 7 in a state where the fitting groove 92 is oriented in the upper and lower direction.

On a rear surface of the rear cam 81 and the outer radial direction of the rear shaft 90, two engagement recesses 94A,

94B are formed in the radial direction. One engagement recess 94A is formed in the same phase as the diameter direction in which the fitting groove 92 extends when viewed from the rear. The other engagement recess 94B is positioned on the left side in a circumferential direction of the engagement recess 94A when viewed from the rear. The engagement recess 94B is positioned behind the rear cam claw 87.

The conical spring 82 is externally mounted on the front shaft 86 between the front cam 80 and the rear cam 81. The conical spring 82 is a tapered coil spring that decreases in diameter toward the front end. The conical spring 82 is positioned inside each front cam claw 84 of the front cam 80 and each rear cam claw 87 of the rear cam 81, and biases the front cam 80 forward. Therefore, the restricting plate 71 in contact with the front cam 80 is also biased forward together with the front cam 80. The advancing restricting plate 71 causes front ends of the left and right restricting portions 76 to contact the receiving portions 44 of the change plate 43. Therefore, the tool holder 35 is biased to the advance position illustrated in FIGS. 3 and 4, where the stopper ring 41 contacts the bearing 37. At this time, the front cam 80 is pressed against the base end portion 75 by the biasing of the conical spring 82 such that the rear end of each front cam claw 84 comes slightly in front of the front end of each rear cam claw 87 of the rear cam 81. The conical spring 82 is one example of a biasing member of the disclosure.

The operation lever 73 includes a disc portion 100 and a lever 101. The disc portion 100 has an outer diameter that is larger than an outer diameter of the small diameter portion 28 of the middle cylinder portion 21. A front portion 102 of the disc portion 100 has the same diameter as the rear shaft 90 of the rear cam 81 and is fitted to the small diameter portion 28 from rear. Two protrusions 103 are formed on a front surface of the front portion 102 in the diameter direction. The protrusions 103 are fitted with the fitting groove 92 of the rear cam 81. The disc portion 100 is connected to the rear cam 81 by screwing a screw 104, which passes through the center of the disc portion 100 from the front, into the screw hole 93 of the rear cam 81. On an outer circumference of the disc portion 100, a notch portion 105 is formed on an upper side of the diameter direction where the protrusions 103 extend when viewed from the rear. On a left end of the notch portion 105, a press portion 106 with a curved peripheral surface is formed.

The lever 101 protrudes in radial direction outward from the disc portion 100. The protruding direction of the lever 101 is a lower side in the diameter direction where the protrusions 103 extend on the opposite side of the notch portion 105. A notch 107 is formed on a lower left side of the small diameter portion 28 and allows the lever 101 to protrude. The operation lever 73 is one example of an operation member of the disclosure.

Figure 8:
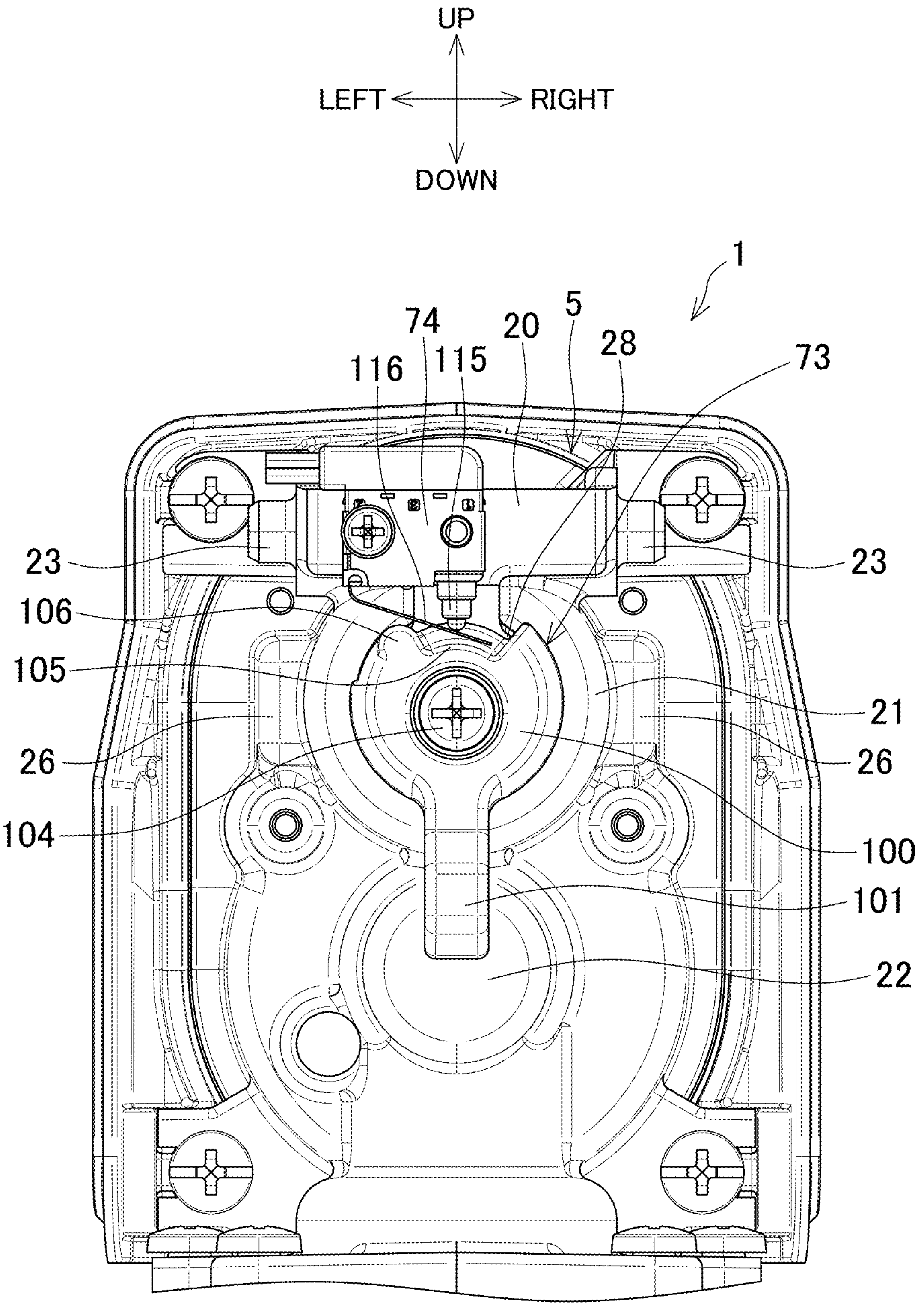
FIG. 8 is a rear view of an operation lever portion with the body housing omitted in the hammer drill mode.

FIG. 8 illustrates a first operating position of the operation lever 73, in which the lever 101 protrudes straight down when viewed from the rear. In the first operating position, the rear cam 81 is in the first rotational position in which each rear cam claw 87 is shifted alternately in a circumferential direction relative to each front cam claw 84 of the front cam 80. The first rotational position is one example of a first posture of the rear cam of the disclosure.

Therefore, the front cam 80 and the restricting plate 71 are in the first switch state, in which the retreat is allowed. Therefore, the tool holder 35 is also allowed to retreat together with the change plate 43.

Figure 9:
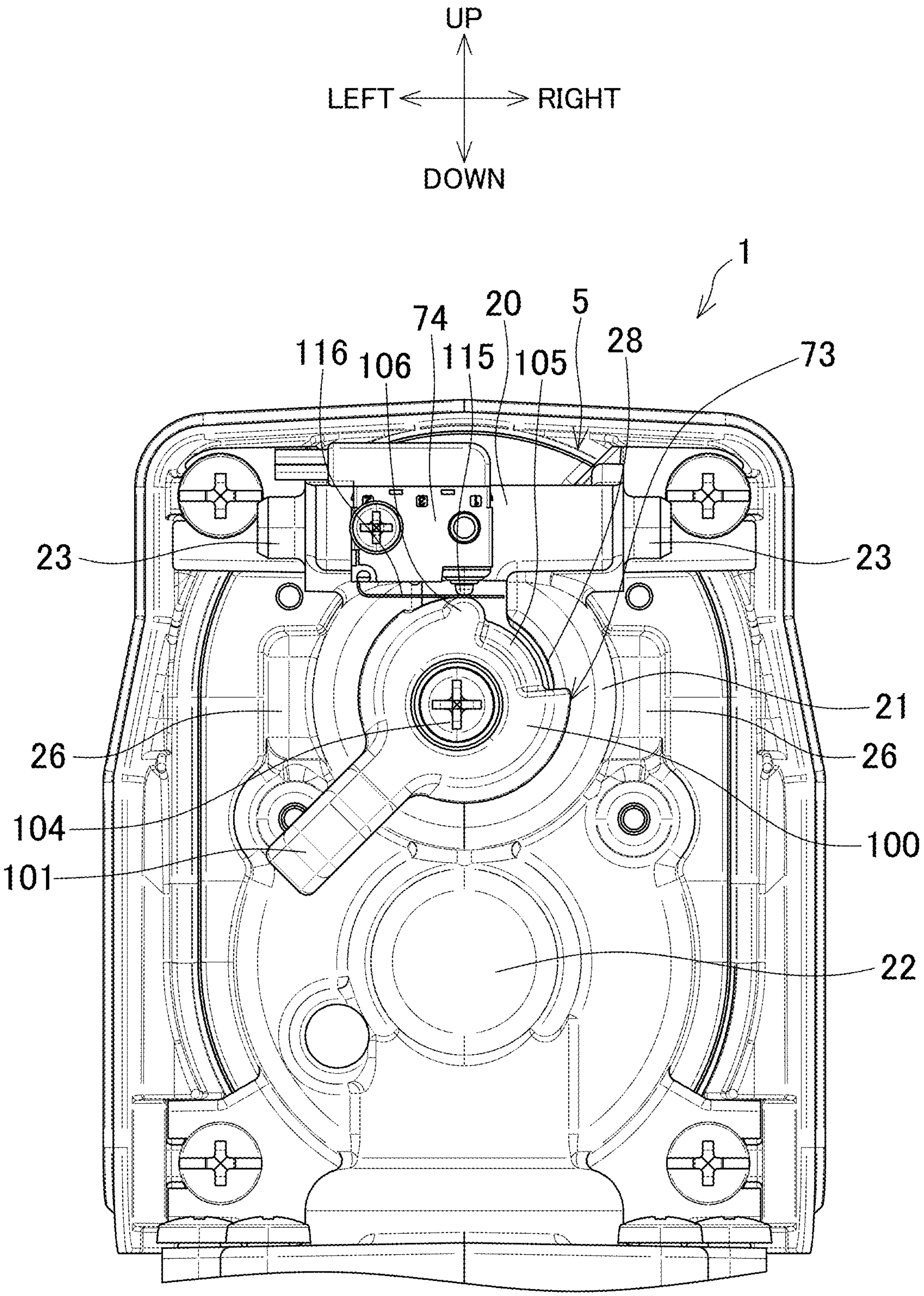
FIG. 9 is a rear view of the operation lever portion with the body housing omitted in a rotation-only mode.

FIG. 9 illustrates a second operating position of the operation lever 73, in which the lever 101 protrudes to a lower left when viewed from the rear. In the second operating position, the rear cam 81 is in a second rotational position in which the respective rear cam claws 87 are positioned vertically and horizontally. The second rotational position is one example of a second posture of the rear cam of the disclosure. Therefore, each rear cam claw 87 is in the same phase as each front cam claw 84 of the front cam 80 and is positioned immediately behind each front cam claw 84.

As a result, the front cam 80 and the restricting plate 71 are in the second switch state, where a movement to the rear is restricted. Therefore, the tool holder 35 is also restricted from retreating as the receiving portions 44 of the change plate 43 come into contact with the restricting portions 76 of the restricting plate 71.

As illustrated in FIG. 3, a blind hole 110 opening forward is formed in an upper side of the small diameter portion 28. A coil spring 111 and a ball 112 biased forward by the coil spring 111 are housed in the blind hole 110. The ball 112 is engaged in the forward-positioned engagement recess 94A in the first rotational position of the rear cam 81. The ball 112 is engaged in the forward-positioned engagement recess 94B in the second rotational position of the rear cam 81. Therefore, a clicking action occurs when switching the operation lever 73 to the first or second operating position.

A cover portion 113 is provided on a front inner peripheral surface of the loop-shaped portion of the body housing 2 and above the operation panel 18. The cover portion 113 covers almost the entire disc portion 100 of the operation lever 73, and the lower portion of the disc portion 100 and the lever 101 protrude from an opening 114 provided in the lower portion.

The mode-detection switch 74 is screwed to a rear surface of the upper plate portion 20 of the inner housing 5, above the disc portion 100 of the operation lever 73. The mode-detection switch 74 is a microswitch that turns on when a protruding plunger 115 is pressed by a lever plate 116. The mode-detection switch 74 is attached to the rear surface of the upper plate portion 20 in a posture in which the lever plate 116 positioned down and the plunger 115 on the right side. In this state, the lever plate 116 is positioned above the disc portion 100.

In the first operating position of the operation lever 73 illustrated in FIG. 8, the notch portion 105 faces upward, and the lever plate 116 is positioned in the notch portion 105. Therefore, the lever plate 116 and the plunger 115 are not pushed in, and the mode-detection switch 74 does not turn on. On the other hand, in the second operating position of the operation lever 73 illustrated in FIG. 9, the press portion 106, which has rotated clockwise when viewed from the rear, comes into contact with the lever plate 116 and pushes it upward. Therefore, the plunger 115 is pushed by the lever plate 116, and the mode-detection switch 74 turns on.

In the hammer drill 1 configured as described above, the lever 101 of the operation lever 73 is grasped and operated to the first operating position illustrated in FIG. 8. Then, the rear cam 81 moves to the first rotational position, and the hammer drill mode is entered, in which a rotational/hammering action is obtained in conjunction with the retreat of the tool holder 35. The hammer drill mode is one example of a first operation mode of the disclosure.

Figure 10:
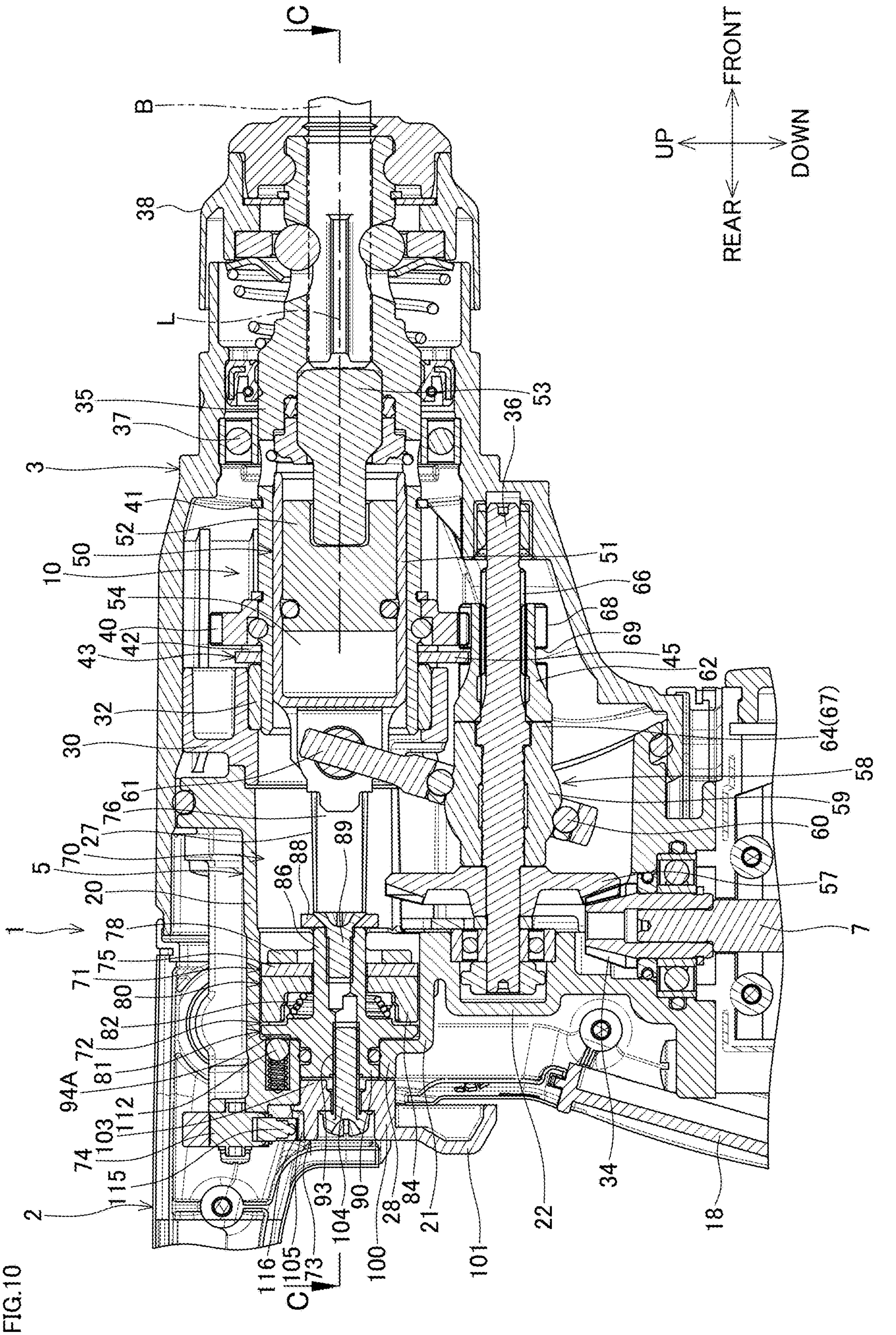
FIG. 10 is a diagram describing a tool holder in a retreated state in FIG. 3.
Figure 11:
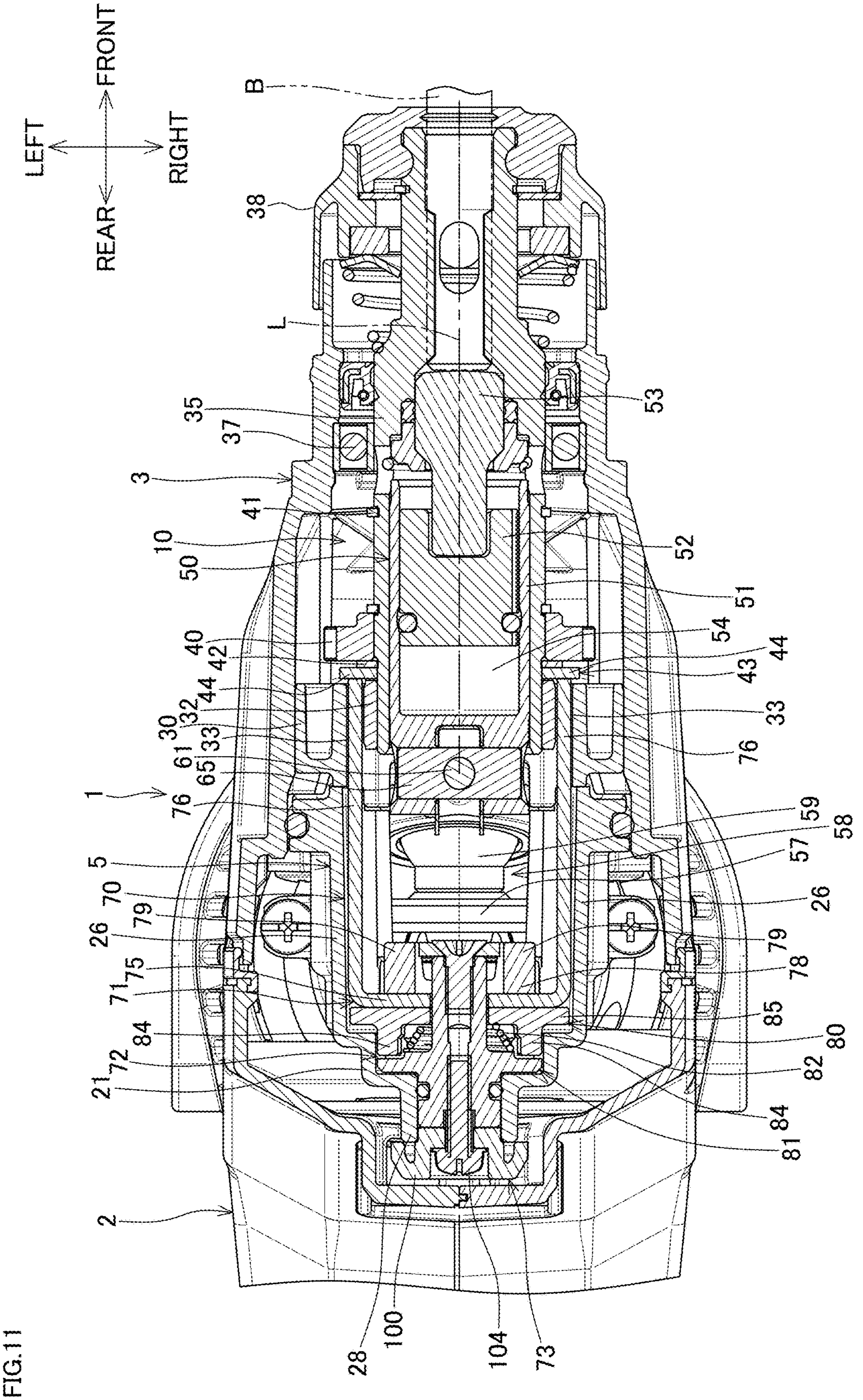
FIG. 11 is a cross-sectional view taken along line C-C in FIG. 10.

First, when the operator presses the bit B mounted to the front end of the tool holder 35 against a workpiece, a pushing force is applied to the tool holder 35. In the first operating position, as described above, the front cam 80 and the restricting plate 71 are in the first switch state, and the retreat is allowed. As a result, the tool holder 35, together with the restricting plate 71 and the front cam 80 via the change plate 43, retreats to the retreated position against a biasing force of the conical spring 82, as illustrated in FIGS. 10 and 11. The change plate 43, which has retreated together with the tool holder 35, causes the clutch gear 62 to retreat. In the retreated position of the tool holder 35, the clutch gear 62 engages the gear side engagement portion 67 with the boss side engagement portion 64 of the boss sleeve 59 while maintaining the meshing state of the third gear 68 and the fourth gear 40.

In this state, when the trigger 13 is pressed to turn the switch 12 on, the controller 16 lights up the button 19A of the hammer drill mode and drives the motor 6. The rotation shaft 7 then rotates, causing the first gear 34 to rotate together with the rotation shaft 7 and the intermediate shaft 36 to rotate at the reduced speed via the second gear 57. Therefore, the boss sleeve 59 of the rotation conversion portion 58, which has become active by engaging with the clutch gear 62, rotates together with the intermediate shaft 36. When the boss sleeve 59 rotates, the rod 61 oscillates forward and rearward by the swash bearing 60, causing the piston cylinder 51 of the striking portion 50 to move forward and rearward on the strike axis line L. Then, the striker 52 reciprocates on the strike axis line L linked with the movement of the piston cylinder 51 via the air chamber 54 and strikes the bit B indirectly via the impact bolt 53. At the same time, the rotation of the third gear 68 of the clutch gear 62 is transmitted to the tool holder 35 via the fourth gear 40. Therefore, the tool holder 35 rotates for rotating the bit B.

Figure 12:
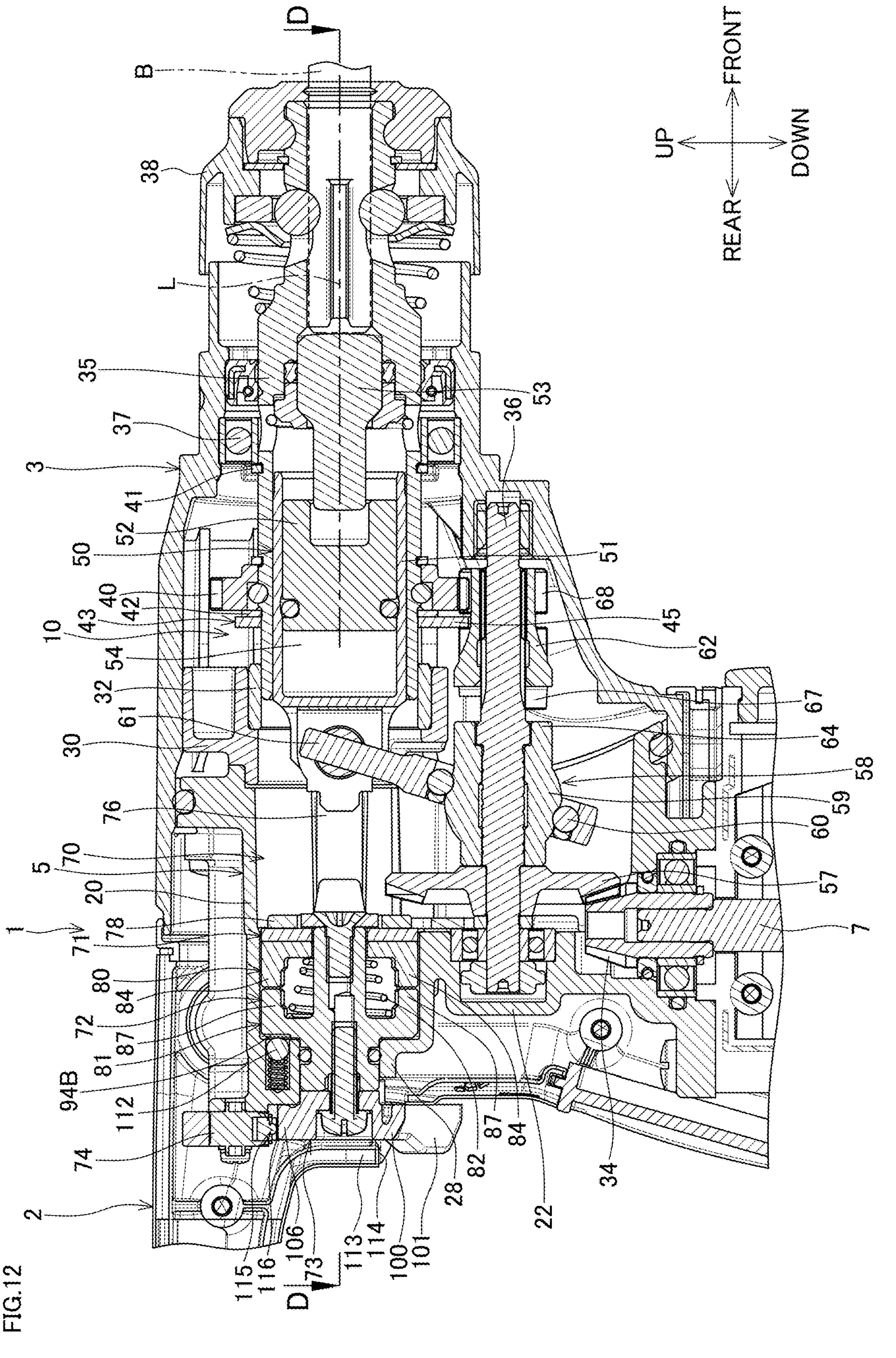
FIG. 12: is an enlarged view of the rotation and strike mechanism in the rotation-only mode in FIG. 3.
Figure 13:
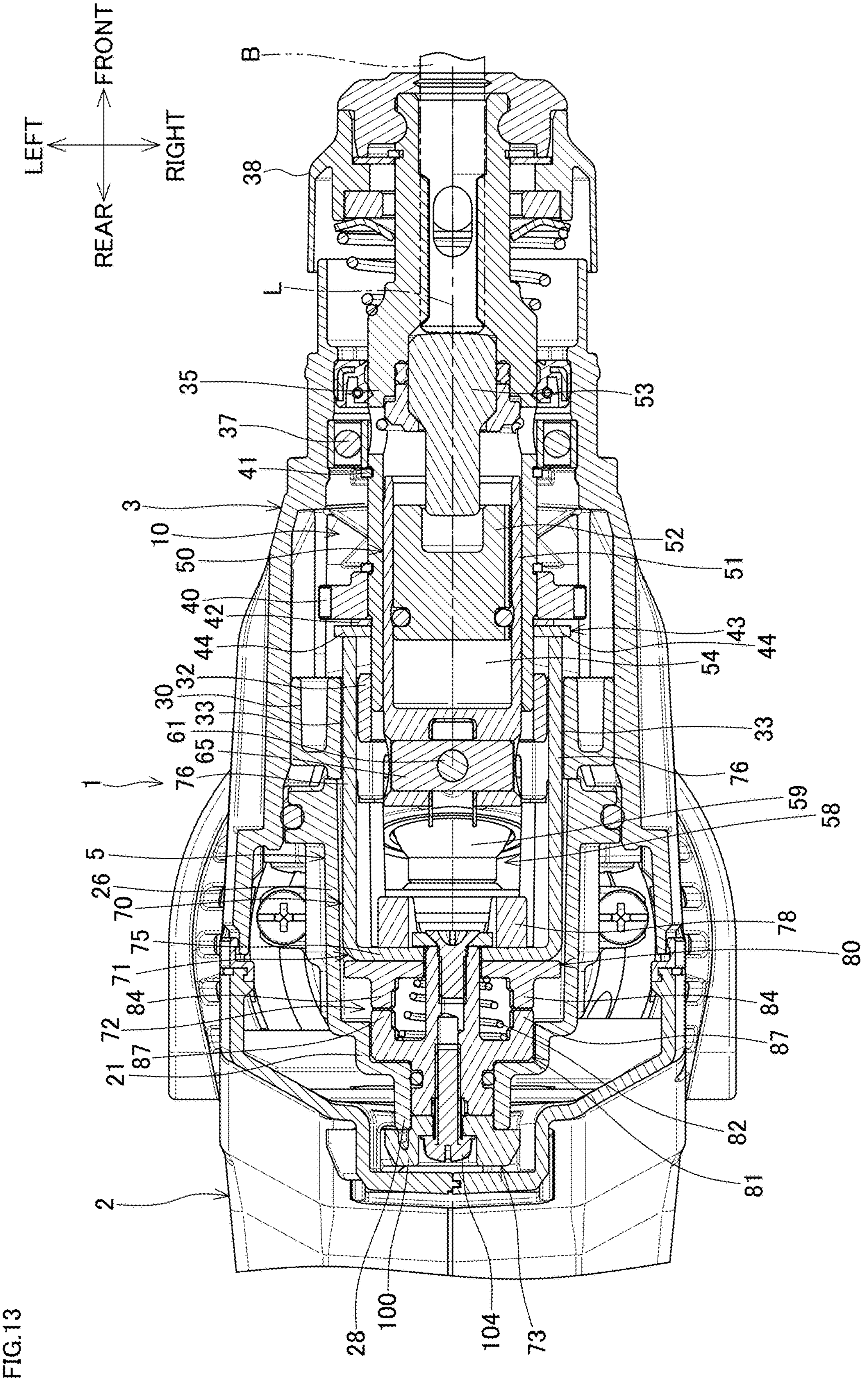
FIG. 13 is a cross-sectional view taken along line D-D in FIG. 12.

Next, the lever 101 of the operation lever 73 is grasped and operated to the second operating position in FIG. 9. As illustrated in FIGS. 12 and 13, the rear cam 81 becomes in the second rotational position. In addition, the restricting plate 71 becomes in the second switch state where the retreat is restricted by the front cam 80 in contact with the rear cam 81. Therefore, the movement of the tool holder 35 in the rearward direction is restricted by the change plate 43 coming into contact with the restricting portions 76. Therefore, even when the bit B mounted to the front end of the tool holder 35 is pressed against a workpiece, the tool holder 35 does not retreat while the clutch gear 62 also does not retreat. Therefore, the rotation conversion portion 58 becomes inactive, and when the motor 6 drives the intermediate shaft 36 to rotate, it enters the rotation-only mode in which the rotation from the clutch gear 62 is transmitted to the tool holder 35.

In the rotation-only mode, the press portion 106 of the disc portion 100 of the operation lever 73 presses the lever plate 116 of the mode-detection switch 74 to turn the mode-detection switch 74 on. The controller 16 then lights up the button 19B of the drill mode and the button 19C of the clutch mode on the operation panel 18.

Here, the operator selects the drill mode and presses the button 19B for operation. The controller 16 then switches to the drill mode in which the motor 6 drives the rotation shaft 7 to rotate at a predetermined speed. Therefore, the bit B mounted to the tool holder 35 is allowed to rotate to perform drilling work.

Meanwhile, the operator selects the clutch mode and presses the button 19C for operation. The controller 16 then drives the motor 6 to rotate the rotation shaft 7 at a lower speed than in the drill mode and switches to the clutch mode. The clutch mode employs an electronic clutch that stops the motor 6 when a current value to the motor 6 reaches a predetermined value, that is, a torque setting value. Therefore, when the bit B with a screwdriver bit attached to a tip thereof is mounted on the tool holder 35 and screw tightening is then performed, the screw tightening is completed at the torque setting value that has increased as the screw tightening progresses. In addition, the forward and reverse switch button 14 is operated to rotate the tool holder 35 in reverse rotation, the fastened screw is also allowed to be loosened.

The drill mode and the clutch mode, which are rotation-only modes, are one example of a second operation mode of the disclosure.

Figure 14:
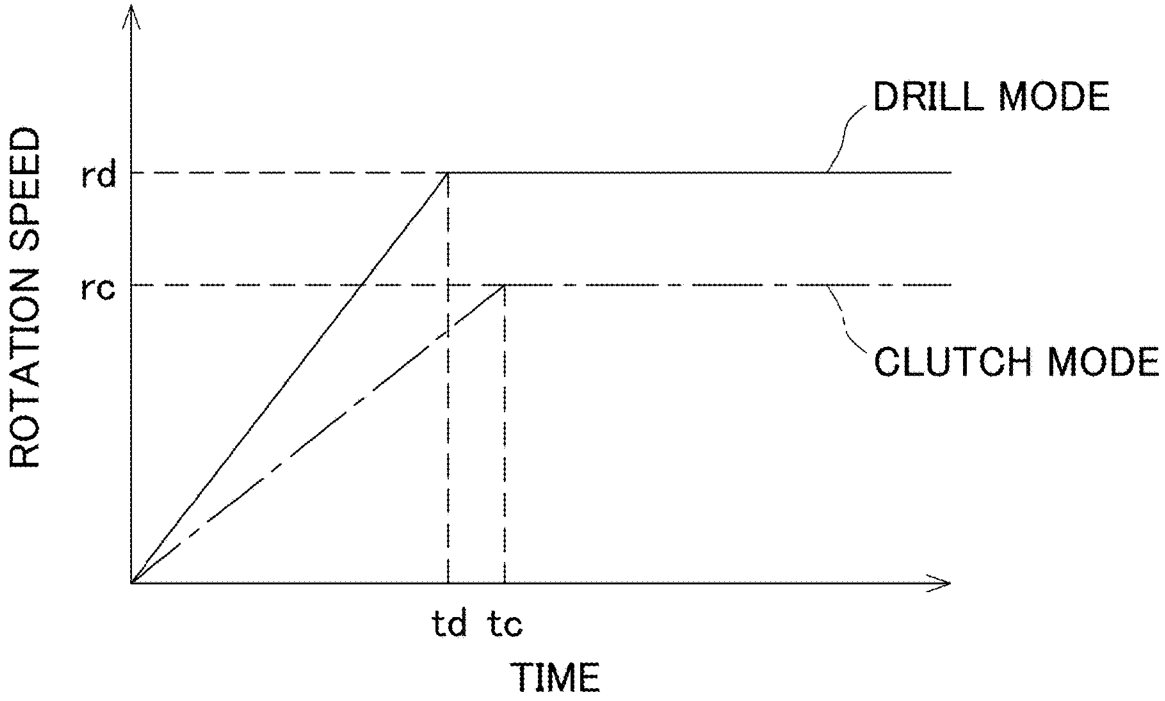
FIG. 14 is a graph showing a maximum rotation speed and a time taken to reach the speed in each of a drill mode and a clutch mode.

FIG. 14 shows changes in the rotation speed of the motor 6 in the drill mode and the clutch mode. In an initial setting for the maximum rotation speed, the maximum rotation speed in the drill mode (rd) is higher than the maximum rotation speed in the clutch mode (rc). Also, a time from when the motor 6 starts up to when it reaches the maximum rotation speed is shorter in the drill mode (td) than in the clutch mode (tc).

In addition, after selecting the clutch mode, the torque setting value can be adjusted in stages by pressing the lit button 19C a plurality of times. For example, each time the button 19C is pressed, the torque setting value T increases in stages in an order of a predetermined T1-T2-T3-T4. When the button 19C is pressed again from the highest setting T4, the torque setting value T returns to the lowest setting T1. The number of stages for the torque setting value T can be more or less. The operation panel 18 may be provided with a display portion that shows the number of stages as a number or a scale.

On the other hand, when the drill mode or the clutch mode is selected in the rotation-only mode, the controller 16 stores the selected drill mode or clutch mode. Subsequently, when the hammer drill mode is selected and then the rotation-only mode is selected again, the controller 16 automatically selects the stored drill mode or clutch mode and lights up the corresponding button 19B or button 19C. Therefore, in cases where the same work, namely screw tightening or drilling, is repeated after use in the hammer drill mode, there is no need to press and operate the button 19B or the button 19C each time.

In both the drill mode and the clutch mode, when the bit B is pressed against a workpiece, a pushing force is applied to the tool holder 35 in the rearward direction. Therefore, the pushing force is also applied to the restricting plate 71, which restricts the retreat of the tool holder 35 via the change plate 43.

However, as illustrated in FIG. 13, the restricting portions 76 of the restricting plate 71 are arranged in a symmetrical position with respect to the strike axis line L, and equally support the left and right receiving portions 44 of the change plate 43. Therefore, even when the pushing force increases, the restricting plate 71 does not deform or tilt. As a result, the retreated positions of the change plate 43 and the tool holder 35 are stabilized, and in turn, the advance position of the clutch gear 62 is also stabilized. Therefore, the boss sleeve 59 does not engage with the clutch gear 62 in both the drill mode and the clutch mode, and the inactive state of the rotation conversion portion 58 is maintained.

In both the drill mode and the clutch mode, friction occurs between the inactive boss sleeve 59 and the rotating intermediate shaft 36. The friction may cause the boss sleeve 59 to rotate in unison and the rod 61 to oscillate.

However, the rubber plate 78 is provided on the front surface of the base end portion 75 of the restricting plate 71. Therefore, when the piston cylinder 51 retreats as the rod 61 oscillates rearward, the rear end of the piston cylinder 51 comes into contact with the left and right stopper portions 79 of the rubber plate 78. Thus, the further retreat of the piston cylinder 51 is inhibited. Therefore, the rotation of the boss sleeve 59 via the rod 61 is restricted, and unexpected hammering operation is suppressed.

As illustrated above, the hammer drill 1 includes the motor 6, the tool holder 35, the intermediate shaft 36, the rotation conversion portion 58, the change plate 43, the restricting plate 71, and the operation lever 73.

In the first switch state of the restricting plate 71 by the operation lever 73, the hammer drill 1 is in the hammer drill mode in which the rotation of the tool holder 35 and the striking motion of the striking portion 50 can be simultaneously performed as the tool holder 35 is retreated to the retreated position. Furthermore, in the second switch state of the restricting plate 71 by the operation lever 73, the hammer drill 1 becomes the drill mode or the clutch mode in which the retreat of the tool holder 35 from the advance position is restricted and the tool holder 35 is rotatable only.

The restricting plate 71 is arranged behind the change plate 43 in the direction of the strike axis line L, and the restricting plate 71 is symmetrically provided with the two restricting portions 76 that contact the change plate 43 and restrict the change plate 43 from being retreated, with one each positioned in the left and right regions opposed one another with respect to the strike axis line L.

According to the configuration, in the drill mode and the clutch mode, the left and right two restricting portions 76 provided on the restricting plate 71 can receive the change plate 43 in a balanced manner to restrict the retreat of the tool holder 35. Therefore, even when the pushing force on the tool holder 35 increases, the retreat restriction position of the tool holder 35 can be stabilized to improve the reliability in the drill mode and the clutch mode.

The two restricting portions 76 are provided on both the left and tight sides of the strike axis line L.

Therefore, the retreat restriction position of the tool holder 35 can be stabilized with the minimum number of the restricting portions 76.

The restricting plate 71 is movable forward and rearward in the direction of the strike axis line L, retreats in conjunction with the retreat of the change plate 43 in the first switch state, and moves forward to restrict the retreat of the change plate 43 in the second switch state.

Therefore, even when the restricting plate 71 is provided behind the tool holder 35, the use in the hammer drill mode is not interfered.

The cam mechanism 72 allows the restricting plate 71 to retreat in the first switch state and causes the restricting plate 71 to move forward in the second switch state.

Therefore, the switch of the forward and rearward movement of the restricting plate 71 can be easily performed in a space-saving manner.

The cam mechanism 72 is provided with the conical spring 82 that biases the tool holder 35 forward.

Therefore, the tool holder 35 can protrude to the advance position using the conical spring 82 provided in the cam mechanism 72.

The cam mechanism 72 includes the front cam 80 and the rear cam 81. The front cam 80 is arranged behind the restricting plate 71 and movable forward and rearward. The rear cam 81 is arranged behind the front cam 80 and changes the posture between the first rotational position and the second rotational position. The first rotational position allows the front cam 80 to be retreated in response to the operation of the operation lever 73. The second rotational position restricts the front cam 80 from being retreated at the front.

The biasing member is the conical spring 82 provided between the front cam 80 and the rear cam 81, and biases the restricting plate 71 and the change plate 43 together with the front cam 80 forward.

Therefore, the conical spring 82, which is not prone to buckling, can add the biasing force without loss in the direction of the strike axis line L.

The restricting plate 71, the cam mechanism 72, and the operation lever 73 are arranged on the strike axis line L.

Therefore, the tool holder 35 and the change plate 43 can be moved smoothly forward and rearward on the strike axis line L to perform the mode switching.

The rubber plate 78 is provided on the restricting plate 71 to suppress the rotation conversion portion 58 from operating in the drill mode and the clutch mode.

Therefore, unexpected striking motions can be effectively suppressed in the drill mode and clutch mode.

The striking portion 50 includes the piston cylinder 51 and the striker 52. The piston cylinder 51 is movable forward and rearward and housed into the tool holder 35 from the rear. The striker 52 is housed in the piston cylinder 51 and linked to the forward and rearward movement of the piston cylinder 51.

The rotation conversion portion 58 includes the boss sleeve 59 and the rod 61. The boss sleeve 59 is externally mounted on the intermediate shaft 36 and rotatable together with the intermediate shaft 36 when switched to the active by the change plate 43. The rod 61 is connected to the rear end of the piston cylinder 51 and oscillates forward and rearward in conjunction with the rotation of the boss sleeve 59.

The rubber plate 78 indirectly suppresses the boss sleeve 59 from rotating by contacting the rear end of the piston cylinder 51, which has retreated together with the rod 61, and by restricting the oscillation of the rod 61.

Therefore, the restriction of oscillation of the rod 61 of the rotation conversion portion 58 can easily suppress unexpected striking motions in the drill mode and the clutch mode.

The rubber plate 78 is integrally molded with the restricting plate 71.

Therefore, the rubber plate 78 can be securely arranged behind the piston cylinder 51 using the restricting plate 71.

The following describes examples of modifications of the disclosure.

The restricting portions of the restricting member are not limited to the above-described example where two restricting portions are provided on the left and right of the strike axis line. The restricting portions may be provided one each in the two upper and lower regions opposed one another with respect to the strike axis line, or one each in the two regions at an angle opposed one another with respect to the strike axis line.

The number of the restricting portions may be three or more. In this case, the restricting portions may be arranged in the two regions opposed one another with respect to the strike axis line, with one or more of them in each region.

The restricting portions are sufficient when they can restrict the retreat of the mode switching member without tilting. Therefore, the plurality of restricting portions do not have to be arranged at equal intervals in the circumferential direction and do not have to be arranged on concentric circles with respect to the strike axis line.

The restricting portion may be a long circular arc plate in the circumferential direction, rather than the strip plate as in the above-described embodiment. The restricting portion may be rod-shaped rather than plate-shaped.

Another shape of the restricting member can be changed as appropriate. The base end portion where the restricting portions are connected may have another shape, such as a square or polygon, rather than the circle as in the above-described embodiment. The base end portion may be, for example, a curved plate or a spherical plate, rather than the flat plate.

The mode switching member can also be changed as appropriate to match the shape of the restricting portion of the restricting member. For example, the number and position of the receiving portions can be changed, or the receiving portions can be eliminated and the entire ring surface can be used to receive the plurality of restricting portions.

The strike protection member does not have to be integrally molded with the restricting member, as the rubber plate in the above-described embodiment. The shape of the strike protection member can be changed as appropriate. For example, the size and shape of the stopper portions may be changed. The strike protection member can be something that contacts the rod of the rotation conversion portion, for example, rather than the piston cylinder of the striking portion.

There may be more than one strike protection member. The strike protection member may be omitted.

The shapes of the front cam and the rear cam of the cam mechanism may be changed as appropriate. For example, the number and shape of the front and rear cam claws may be changed. The front cam may be provided as an integral part of the restricting member.

The biasing member does not have to be the conical spring. The biasing member may be more than one. For example, two coil springs of different diameters may be arranged in double, or a plurality of coil springs may be arranged evenly in a circumferential direction with respect to the strike axis line.

The operation member does not have to be in the shape of the lever as in the above-described embodiment. For example, the operation member may be in the shape of a dial. The operating position may be reversed between the hammer drill mode and the rotation-only mode. The operation member does not have to be arranged behind the cam mechanism. For example, the operation member may be provided on an outer circumference of the rear cam and protrude from a side or top of the housing to allow operation.

In the above-described embodiment, the drill mode and the clutch mode can be selected as the second operation mode for rotation only. However, the second operation mode may also be set to the drill mode only. In this case, the mode-detection switch and the operation panel can be omitted.

As disclosed in JP 6735118 B, it is also possible to switch the gear, namely the third gear 68 in the above-described embodiment, to a position for coupling to the intermediate shaft and a position for not coupling to the intermediate shaft, so as to also select the hammer mode.

The motor is not limited to one where the rotation shaft faces upward. The motor may be one where the rotation shaft is inclined.

The grip portion does not have to be loop-shaped.

The hammer drill can be an AC machine that does not have to use a battery pack as a power source.

As illustrated above, the hammer drill 1 includes the motor 6, the controller 16, the tool holder 35, the rotation conversion portion 58, and the change plate 43. The hammer drill 1 allows selection of the hammer drill mode, in which the tool holder 35 can rotate and the striking portion 50 can strike simultaneously, and the rotation-only mode, in which the tool holder 35 can rotate only, according to the active/inactive switch state of the rotation conversion portion 58 by the change plate 43.

In addition, when the rotation-only mode is selected, the first rotation mode, namely the clutch mode, and the second rotation mode, namely the drill mode, which are mutually different in the rotation control of the motor 6 by the controller 16, can be further selected.

With the configuration, two rotation modes by the rotation control of the motor 6 can be further selected in the rotation-only mode, without relying on mechanical structure. Therefore, the range of rotation modes that can be selected according to the work is widened, and the ease of use improves. In addition, since the two rotation modes can be selected electrically, the number of parts does not increase, and compactness can be maintained.

The hammer drill 1 includes the intermediate shaft 36 provided in parallel with the tool holder 35, and the rotation of the motor 6 is transmitted to the intermediate shaft 36, which transmits the rotation to the tool holder 35. The rotation conversion portion 58 is provided on the intermediate shaft 36.

Therefore, the switching between the hammer drill mode and the rotation-only mode can be performed without difficulty on the intermediate shaft 36.

The first rotation mode is the clutch mode that stops the rotation of the motor 6 at a predetermined torque applied to the tool holder 35, and the second rotation mode is the drill mode without a clutch function.

Therefore, for example, after forming a pilot hole in a workpiece in the hammer drill mode, the screw can be tightened in the clutch mode, and the work can be done continuously using only the hammer drill 1.

In the clutch mode, the torque can be adjusted.

Therefore, the clutch mode can be used with an appropriate torque according to specific conditions of the screw-tightening work.

In the drill mode, the maximum rotation speed of the motor 6 is set to be higher than in the clutch mode.

Therefore, for example, the drilling work can be easily performed even on a hard workpiece such as concrete.

The time from when the motor 6 starts up to when it reaches the maximum rotation speed is set to be longer in the clutch mode than in the drill mode.

Therefore, it is less likely that the screwdriver bit will come off the screw, known as cam-out, and it is possible to tighten screws smoothly.

The hammer drill 1 further includes the operation lever 73 that switches the change plate 43 between the switch state for the hammer drill mode and the switch state for the rotation-only mode, and the mode-detection switch 74 that detects the operating position of the operation lever 73.

The controller 16 allows the selection of the clutch mode or the drill mode when the mode-detection switch 74 detects the operating position of the operation lever 73 in which the change plate 43 has been switched to the switch state for the rotation-only mode.

Therefore, when the operation lever 73 is switched to the rotation-only mode, the selection of the clutch mode or the drill mode is automatically enabled, making it easier to switch between the rotation modes.

When one of the clutch mode or the drill mode is selected in the rotation-only mode, the controller 16 stores the selected rotation mode, and when the rotation-only mode is selected again after the hammer drill mode is selected, the controller 16 automatically switches to the stored clutch mode or drill mode.

Therefore, when the same task are repeated, namely screw tightening or drilling after using the hammer drill mode, it is possible to save time and effort, making it easier to use.

The hammer drill 1 includes the body housing 2 that houses the motor 6, the tool holder 35, the rotation conversion portion 58, and the change plate 43. The grip portion 11 is formed in the loop shape at the rear portion of the body housing 2.

The operation panel 18, which can be used to select the clutch mode and the drill mode while the rotation-only mode is selected, is provided on the inner peripheral surface of the loop-shaped portion at the front of the grip portion 11.

Therefore, the operation panel 18 can be arranged in a position that is easy to operate and difficult to operate by mistake.

The grip portion 11 houses the switch 12 for driving the motor 6, the switch 12 includes the trigger 13 that protrudes forward, and the operation lever 73 is arranged on the inner peripheral surface of the loop-shaped portion in front of the trigger 13.

Therefore, the operation lever 73 can be arranged in a position that is easy to operate and difficult to operate by mistake.

The rotation of the motor 6 can be switched to either forward or reverse.

Therefore, the clutch mode allows the use for loosening screws in addition to tightening screws.

The following additional disclosure related to the hammer drill can be extracted from the above content.

(1) A hammer drill including:
- a motor;
- a controller that controls drive of the motor;
- a cylindrical tool holder that is configured to hold a tip tool at a front end thereof, includes a striking portion of the tip tool housed therein, and is rotatable in conjunction with the drive of the motor;
- a rotation conversion portion that converts rotation of the motor into striking motion of the striking portion; and
- a mode switching member configured to switch an active/inactive state of the rotation conversion portion, in which
- the hammer drill is configured to select at least a hammer drill mode in which the rotation of the tool holder and the striking motion of the striking portion are allowed to be performed simultaneously, and a rotation-only mode in which the tool holder is allowed to rotate only, depending on a switch state of the rotation conversion portion by the mode switching member, and
- when the rotation-only mode is selected, at least a first rotation mode and a second rotation mode that are mutually different for rotation control of the motor by the controller are allowed to be further selected.

(2) The hammer drill according to (1) including an intermediate shaft provided in parallel with the tool holder, wherein the rotation of the motor is transmitted to the intermediate shaft, the intermediate shaft transmits the rotation to the tool holder, and the rotation conversion portion is provided on the intermediate shaft.

(3) The hammer drill according to (1) or (2) in which the first rotation mode is a mode with clutch function that stops the rotation of the motor at a predetermined torque applied to the tool holder, and the second rotation mode is a mode without clutch function.

(4) The hammer drill according to (3) in which the torque is allowed to be adjusted in the mode with clutch function.

(5) The hammer drill according to (3) or (4) in which a maximum rotation speed of the motor in the mode without clutch function is set to be higher than a maximum rotation speed in the mode with clutch function.

(6) The hammer drill according to any one of (3) to (5) in which a time from a start up of the motor to the maximum rotation speed is set to be longer in the mode with clutch function than in the mode without clutch function.

(7) The hammer drill according to any one of (1) to (6) further including an operation member that operates the mode switching member to switch between a switch state for the hammer drill mode and a switch state for the rotation-only mode, and a position detection sensor that detects the operating position of the operation member, in which
- when the position detection sensor detects an operating position of the operation member in which the mode switching member has been switched to the switch state for the rotation-only mode, the controller allows selection of the first rotation mode and the second rotation mode.

(8) The hammer drill according to (7) in which the controller stores the selected rotation mode when one of the first rotation mode or the second rotation mode is selected in the rotation-only mode, and then automatically switches to the stored first rotation mode or second rotation mode when the rotation-only mode is selected again after the hammer drill mode is selected.

(9) A hammer drill according to (7) or (8) including:
- a body housing that houses the motor, the tool holder, the rotation conversion portion, and the mode switching member, and a grip portion is formed in a loop shape at a rear portion of the body housing; and
- an operation member configured to select the first rotation mode or the second rotation mode while the rotation-only mode is selected, and the operation member is provided on an inner peripheral surface of the loop-shaped portion in front of the grip portion.

(10) The hammer drill according to (9) in which the grip portion houses a switch for driving the motor, and the switch includes a trigger protruding forward, and the operation member is arranged on an inner peripheral surface of the loop-shaped portion in front of the trigger.

(11) The hammer drill according to any one of (1) to (10) in which the rotation of the motor is switchable to forward or reverse.

(12) The hammer drill according to any one of (3) to (6) in which the rotation of the motor is switchable to forward or reverse, and the mode with clutch function is disabled when the rotation of the motor is switched to the reverse rotation.

The following describes other modifications of another disclosure.

In the first rotation mode, it may be configured to select not only one clutch mode, but also a plurality of clutch modes with different maximum rotation speeds and torque setting values of the motor. Similarly, in the second rotation mode, it may be configured to select not only one drill mode, but also a plurality of drill modes with different maximum rotation speeds of the motor.

In the above-described embodiment, it is be configured to adjust the torque in the clutch mode, but it may not be necessary to be able to adjust the torque.

In the above-described embodiment, the maximum rotation speed of the motor is set higher in the drill mode than in the clutch mode, but the maximum rotation speed may be the same in both modes. The time taken from starting up the motor to reaching the maximum rotation speed may also be the same in both modes. The maximum rotation speed may be changeable in both modes. In the clutch mode, the torque setting value may be automatically changed in response to change in the maximum rotation speed.

The operation member is not limited to the operation lever in the above-described embodiment. The operation member may be a dial type, for example, or may be a sliding operation rather than a rotating operation. The position of the operation member may be on a side surface or a top surface of the body housing.

The position detection sensor is not limited to the micro-switch in the above-described embodiment. The position detection sensor may be a non-contact type, such as a photoelectric sensor, for example.

In the above-described embodiment, when the hammer drill mode is selected and then switched to the rotation-only mode again, the stored mode is automatically selected, but the automatic selection may be omitted, or the operation panel may be used to enable or disable automatic selection.

The grip portion does not have to be loop-shaped.

When the motor rotation is switched to reverse rotation, the controller may change the rotation speed between the mode with clutch function and the mode without clutch function.

In addition, when the rotation of the motor is switched to the reverse rotation, the controller may automatically switch to the mode without clutch function, or the mode with clutch function and the mode without clutch function may be selected by operating the operation member.

Accordingly, when the clutch function is disabled during the reverse rotation, the clutch function does not work when loosening screws, which definitely loosen the screws.

In the hammer drill, for example, as disclosed in JP 6735118 B, the gear, namely the third gear 68 in the above-described embodiment, may be switched between the position for coupling to the intermediate shaft and the position for not coupling to the intermediate shaft, so as to allow the hammer mode to be selected.

The mode switching portion is not limited to using the restricting plate and the cam mechanism of the above-described embodiment. For example, the restricting plate and the cam mechanism may be eliminated, and the forward and rearward position of the change plate may be switched by rotational operation of the operation member provided on the side surface of the body housing.

The hammer drill is not limited to those in which the tool holder can be moved forward and rearward to select the operation mode.

The motor does not have to have the rotation shaft that faces upward. The motor may have an inclined rotation shaft.

The controller may be positioned elsewhere. For example, the controller may be positioned on a top of the battery pack or inside the grip portion. The controller may be positioned in a place other than the body housing. The operation member may also be positioned on a side or a top of the body housing.

The rotation conversion portion is not limited to a configuration of having the boss sleeve on the intermediate shaft to oscillate the rod, as in the above-described embodiment. The rotation conversion portion may have a configuration that does not use the intermediate shaft and may include, for example, a crankshaft that rotates by motor drive and a connecting rod that connects an eccentric pin and a piston provided on the crankshaft.

The hammer drill may be an AC machine that does not use a battery pack as a power source.

Next, an example of screw tightening allowed to be performed even with a hammer drill whose clutch mode cannot be selected electrically as in the disclosure is described as Reference example.

Figure 15:
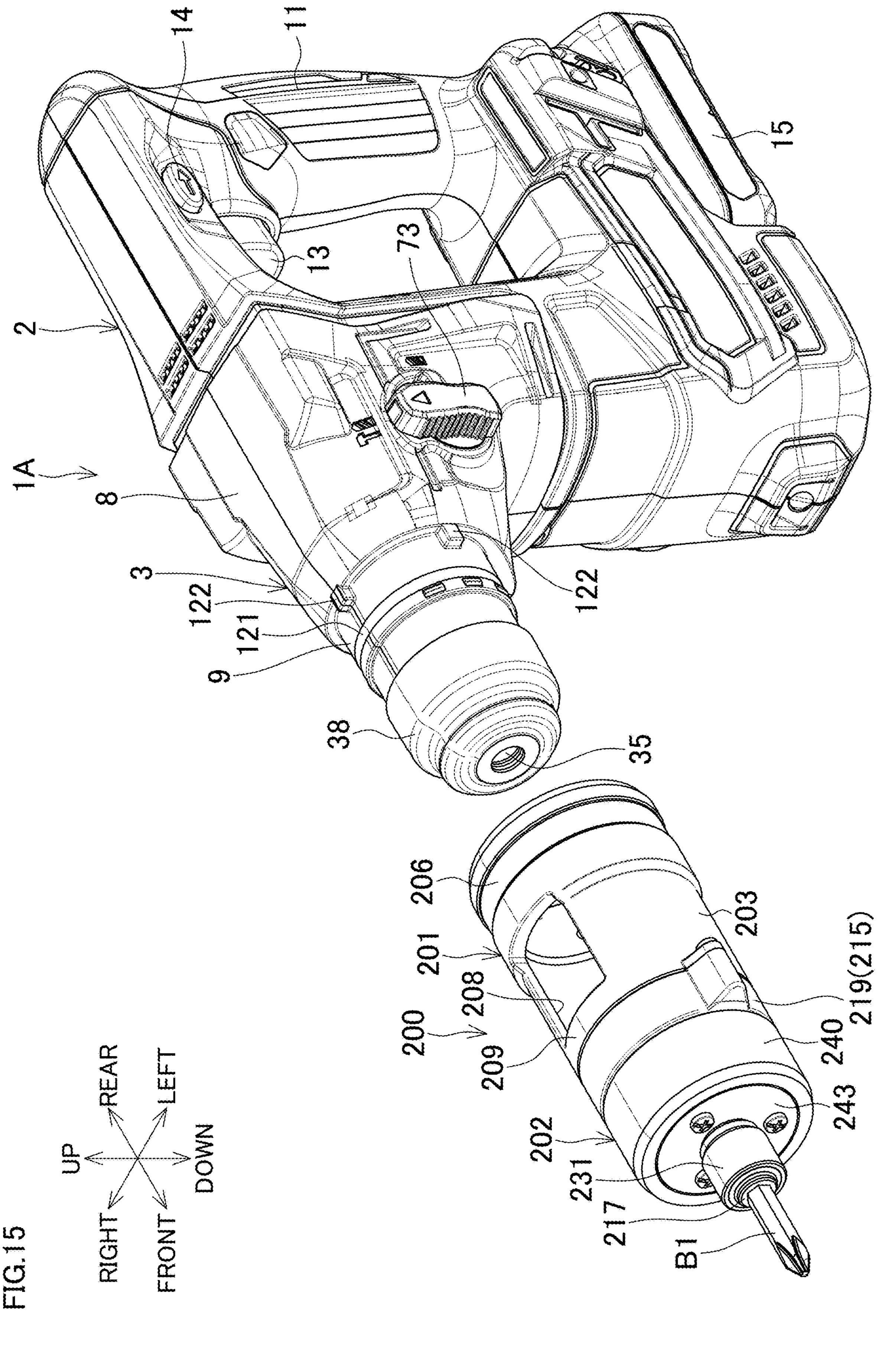
FIG. 15 is a perspective view of a screw-tightening adapter and a hammer drill of Reference example.
Figure 18:
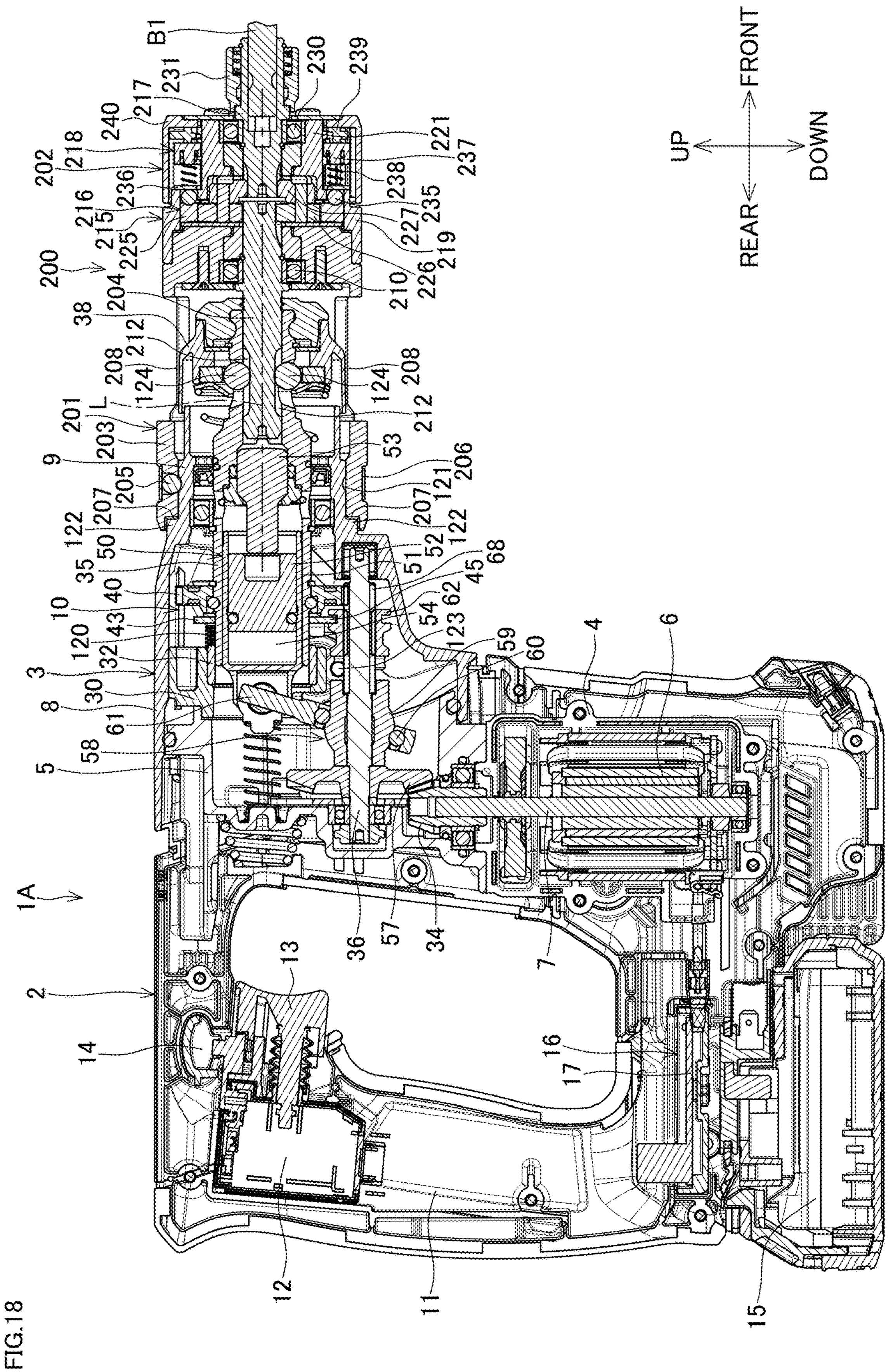
FIG. 18 is a central longitudinal cross-sectional view illustrating the hammer drill with the screw-tightening adapter mounted.

As illustrated in FIG. 15, a screw-tightening adapter (hereinafter simply referred to as "adapter") 200 is mounted to a hammer drill 1A. As illustrated in FIG. 18, since the hammer drill 1A has the same basic configuration as the hammer drill 1 in FIG. 1, the same symbols are used for the same components as in FIG. 1 and the description is omitted.

However, the hammer drill 1A does not have the mode switching portion like the above-described embodiment. Here, two coil springs 120 are interposed between the inner support 30 and the change plate 43, which are used to bias the tool holder 35 to the advance position together with the change plate 43. A ring groove 121 for mounting the adapter 200 is formed on an outer circumference of the front cylinder portion 9 of the front housing 3. Four mounting protrusions 122 are formed at equal intervals around a circumference on the outer circumference of the base of the front cylinder portion 9 at the rear of the ring groove 121.

The operation lever 73 is rotatable and is provided on the left side surface of the front housing 3. The operation lever 73 includes an eccentric pin 123 that protrudes into inside of the front housing 3. The eccentric pin 123 is positioned behind the change plate 43, and the forward and rearward position of the eccentric pin 123 can be changed in conjunction with the rotation of the operation lever 73. In the forward position of the eccentric pin 123, the retreat of the change plate 43 is restricted when the tool holder 35 is in the advance position. At this time, since the clutch gear 62 separates from the boss sleeve 59 forward, the drill mode is entered in which the tool holder 35 is rotated via from the third gear 68 to the fourth gear 40. In the rear position of the eccentric pin 123, the tool holder 35 and the change plate 43 are allowed to retreat from the advance position. Therefore, when the tool holder 35 and the change plate 43 retreat together, the hammer drill mode in which the clutch gear 62, which has retreated together with the change plate 43, engages with the boss sleeve 59 is entered.

Figure 16:
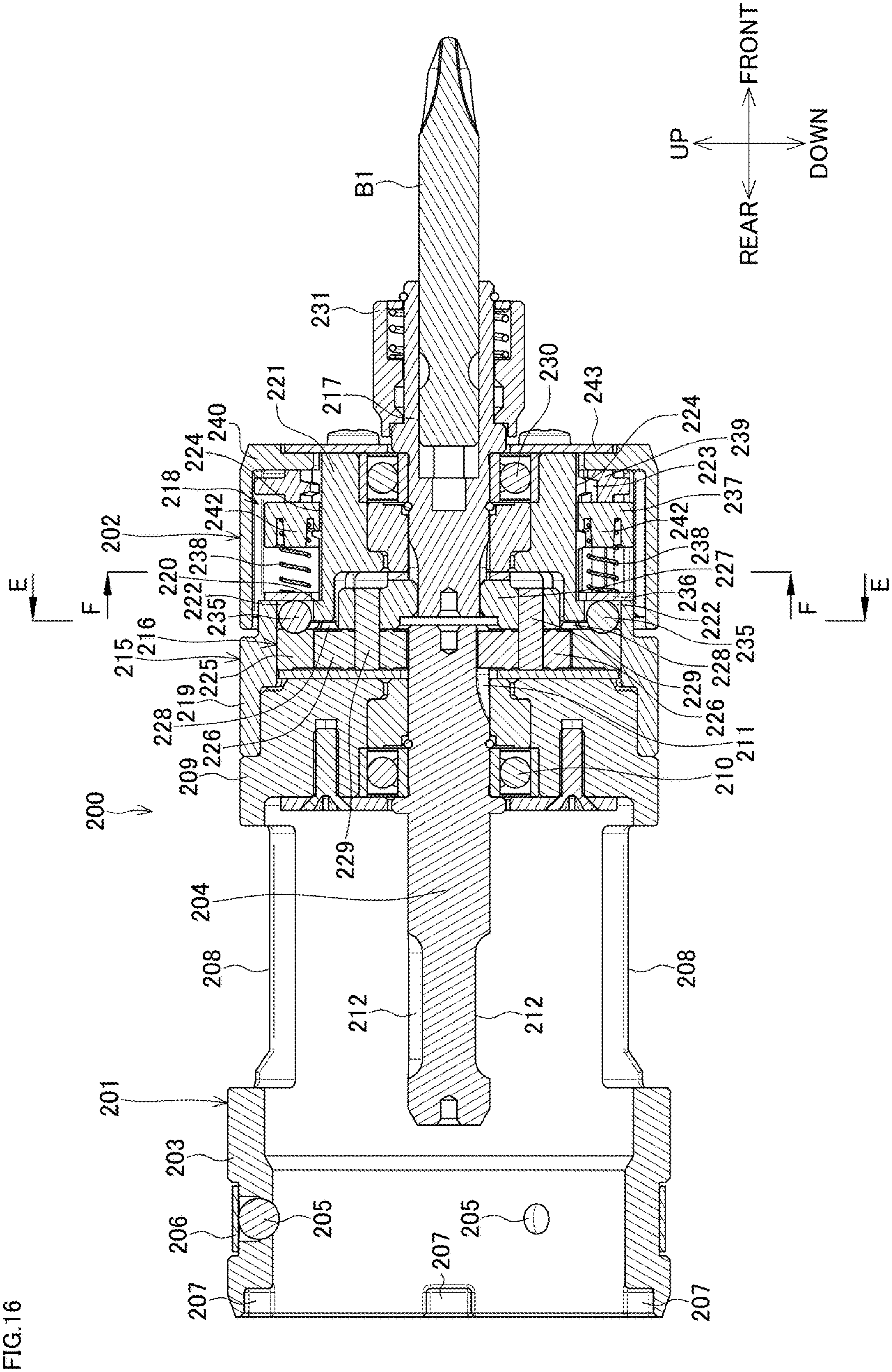
FIG. 16 is a central longitudinal cross-sectional view of the screw-tightening adapter.

As illustrated in FIG. 16, the adapter 200 includes a mounting portion 201 and an output portion 202.

The mounting portion 201 includes a mounting cylinder 203 and an input shaft 204. The mounting cylinder 203 has a cylindrical shape that can be externally mounted on the front cylinder portion 9 of the front housing 3. At a rear portion of the mounting cylinder 203, a plurality, namely three in this case, of balls 205 are housed at equal intervals in a circumferential direction. Each ball 205 is movable in a radial direction of the mounting cylinder 203, and is biased to a position protruding from an inner surface of the mounting cylinder 203 by a ring-shaped leaf spring 206 externally mounted on the mounting cylinder 203. Four mounting recesses 207 are formed at equal intervals in a circumference direction on an inner circumference surface of the rear end of the mounting cylinder 203. Each mounting recess 207 can be engaged from a front with each mounting protrusion 122 provided on the front housing 3. On a front portion of the mounting cylinder 203, operation windows 208 are formed on top and bottom. A connecting plate 209 is disposed on the front side of the operation windows 208.

The input shaft 204 passes through the center of the connecting plate 209. The input shaft 204 is rotatably supported by a bearing 210 held in the connecting plate 209. A pinion 211 is disposed on the front portion of the input shaft 204. The pinion 211 protrudes forward passing through the connecting plate 209. A rear portion of the input shaft 204 includes a pair of recesses 212 extending in the axial direction, and has the same size and shape as the bit B that is grasped at the tip of the tool holder 35.

The output portion 202 includes a gear case 215, a reducer 216, an output shaft 217, and a torque adjuster 218.

Figure 17A:
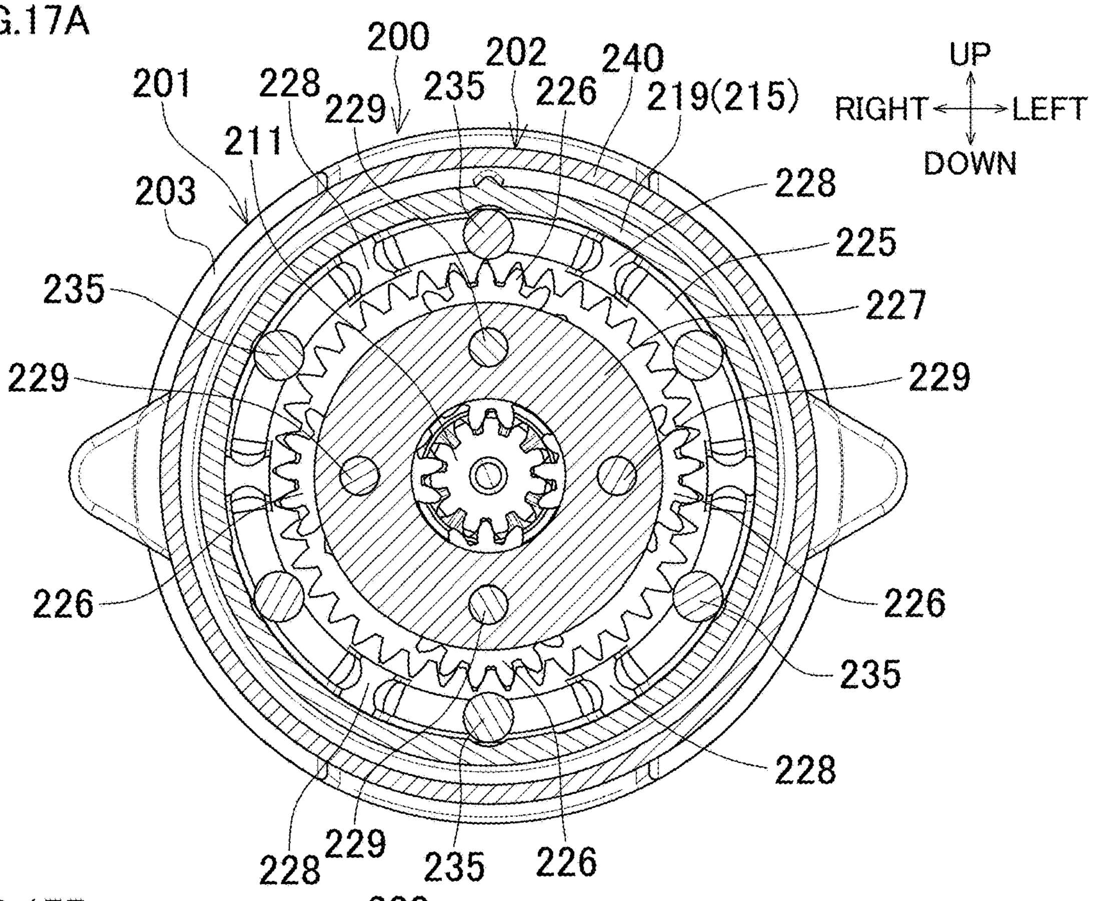
FIG. 17A is a cross-sectional view taken along line E-E in FIG. 16.
Figure 17B:
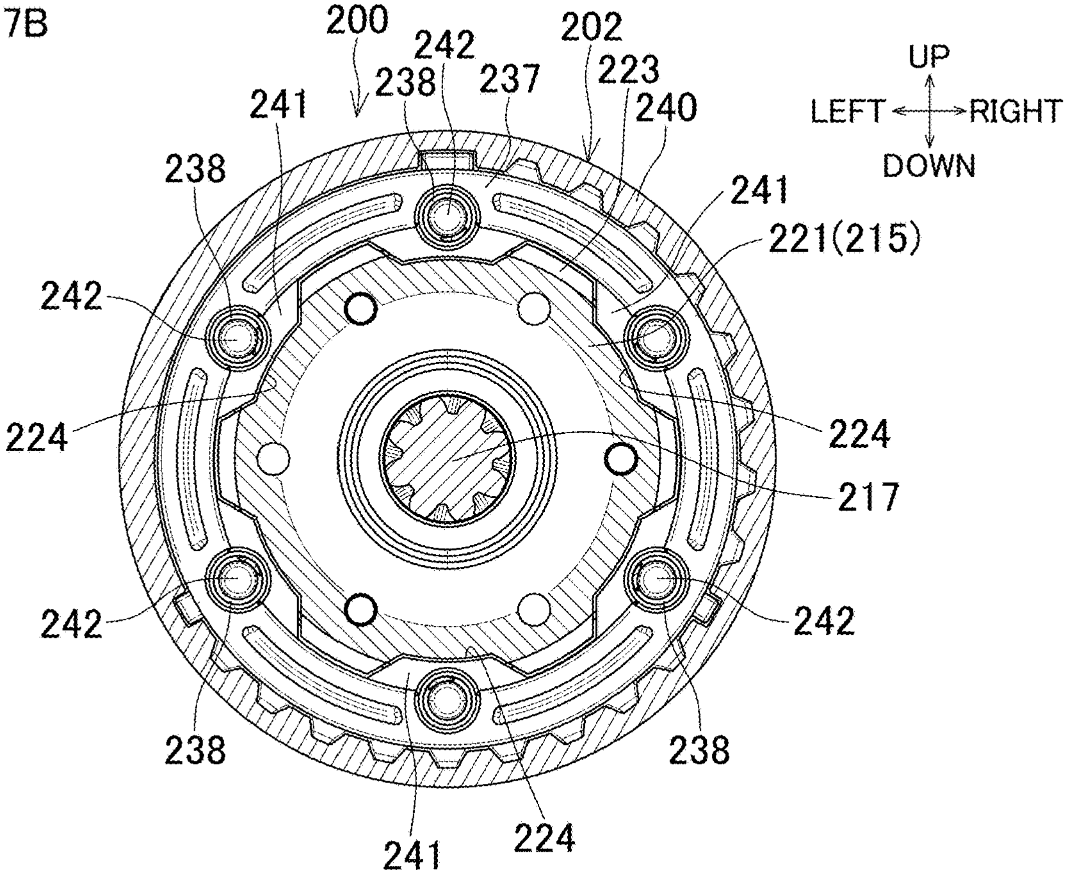
FIG. 17B is a cross-sectional view taken along line F-F in FIG. 16.

The gear case 215 has a cylindrical shape with a two-stage diameter, and includes a large-diameter cylindrical portion 219, a disk portion 220, and a small-diameter cylindrical portion 221. The large-diameter cylindrical portion 219 has the same diameter as the connecting plate 209 of the mounting cylinder 203, and is screwed coaxially to the connecting plate 209. The pinion 211 protrudes coaxially in the large-diameter cylindrical portion 219. The disk portion 220 is ring-shaped and closes off a front end of the large-diameter cylindrical portion 219. The disk portion 220 includes a plurality, namely six in this case, of through-formed retaining holes 222 in the front-rear direction arranged in a concentric circle around the axis center of the disk portion 220. The small-diameter cylindrical portion 221 protrudes forward from the center of the disk portion 220. As illustrated in FIG. 17B, a screw portion 223 and a plurality of, namely six in this case, guide grooves 224 are formed on an outer circumference of the small-diameter cylindrical portion 221. Each guide groove 224 is arranged at equal intervals in a circumferential direction of the small-diameter cylindrical portion 221 and extends in the axial direction to divide the screw portion 223 at equal intervals.

The reducer 216 includes an internal gear 225, four planetary gears 226 and a carrier 227.

The internal gear 225 is held coaxially with the pinion 211 and rotatable in the large-diameter cylindrical portion 219. As illustrated in FIG. 17A, a plurality of, namely six in this case, engagement protrusions 228 are formed in a circumferential direction facing forward on a front surface of the internal gear 225.

Each planetary gear 226 is arranged at equal intervals in a circumferential direction in the large-diameter cylindrical portion 219 between the pinion 211 and the internal gear 225. Each planetary gear 226 meshes with the pinion 211 and the internal gear 225.

The carrier 227 is arranged in front of the planetary gear 226 and supports each planetary gear 226 rotatably with four pins 229.

The output shaft 217 is rotatably supported by a bearing 230 held in the small-diameter cylindrical portion 221. A rear end of the output shaft 217 is splined to the center of the carrier 227, and is rotatable integrally with the carrier 227. A front portion of the output shaft 217 protrudes forward with respect to the small-diameter cylindrical portion 221. A chuck sleeve 231, to which the screwdriver bit B1 can be mounted and detached, is provided on the front portion of the output shaft 217.

The torque adjuster 218 includes six balls 235, a washer 236, a pressing ring 237, six coil springs 238, a screw ring 239, and an adjustment sleeve 240.

Each ball 235 is housed in each retaining hole 222 of the disk portion 220, is movable forward and rearward, and contacts the front surface of the internal gear 225. The washer 236 is positioned in front of the disk portion 220 and contacts each ball 235.

The pressing ring 237 is externally mounted on the small-diameter cylindrical portion 221. As illustrated in FIG. 17B, the inner circumference of the pressing ring 237 includes six protrusions 241 that engage with the respective guide grooves 224 of the small-diameter cylindrical portion 221. Therefore, the pressing ring 237 is movable forward and rearward along the small-diameter cylindrical portion 221 while being restricted from rotation. On a rear surface of the pressing ring 237, six receiving bosses 242 protruding rearwards are formed at equal intervals in a circumferential direction.

Each coil spring 238 is arranged between the washer 236 and the pressing ring 237. A front end of each coil spring 238 is supported by each receiving boss 242 of the pressing ring 237, and the rear end of each coil spring 238 is in contact with the washer 236. Therefore, the washer 236 is pressed against the front surface of the disk portion 220 by each coil spring 238. Each ball 235 is biased rearward via the washer 236 and presses against the front surface of the internal gear 225 between the engagement protrusions 228 to restrict the rotation.

The screw ring 239 is externally mounted on the small-diameter cylindrical portion 221 in front of the pressing ring 237. The screw ring 239 is screwed onto the screw portion 223 of the small-diameter cylindrical portion 221 by the female screw portion provided on the inner circumference. The pressing ring 237, which is biased forward by each coil spring 238, is in contact with the screw ring 239.

The adjustment sleeve 240 is externally mounted on the small-diameter cylindrical portion 221, outside the pressing ring 237, each coil spring 238 and screw ring 239. The adjustment sleeve 240 is rotatable while being suppressed from coming off by a stop plate 243 screwed to the front end of the small-diameter cylindrical portion 221. The adjustment sleeve 240 engages with the screw ring 239 inside the front end and holds the screw ring 239 integrally rotatable. Therefore, when the adjustment sleeve 240 is rotated, the screw ring 239, which integrally rotates, is moved with a screw-feed motion in the front-rear direction, and the pressing ring 237, which contacts the screw ring 239, also moves forward and rearward. As a result, the axial length of each coil spring 238 changes, and the pressing force applied to the internal gear 225 via the washers 236 and each ball 235 changes.

The adapter 200 thus configured allows the mounting cylinder 203 of the mounting portion 201 to be externally mounted on the front cylinder portion 9 from the front of the front housing 3 of the hammer drill 1A. At the same time, the rear end of the input shaft 204 is inserted into the tool holder 35 from the front end. Then, a position of each mounting recess 207 is aligned with a position of each mounting protrusion 122 and push them together until they engage. As illustrated in FIG. 18, the adapter 200 is then mounted to the front housing 3 in a state where the respective balls 205 fit into the ring grooves 121 to suppress them from coming off and rotating. At this time, the input shaft 204 is integrally connected in the direction of rotation by balls 124 held in the operating sleeve 38 engaged in the recesses 212 of the rear end of the input shaft 204. When removing the adapter 200, the operating sleeve 38 is operated to be pushed rearward through the operation windows 208 on the upper and lower sides of the mounting cylinder 203. Thus, since the input shaft 204 is unlocked, it is sufficient to simply pull the input shaft 204 out of the tool holder 35 and pull the mounting cylinder 203 forward from the front housing 3.

When the adapter 200 is mounted to the hammer drill 1A, the axis lines of the input shaft 204 and the output shaft 217 are both positioned on the strike axis line L of the hammer drill 1A, and the rotation of the tool holder 35 is transmitted to the input shaft 204.

In this state, when the screwdriver bit B1 is mounted to the output shaft 217 and the screw is tightened, pressing the trigger 13 to turn the switch 12 on causes the controller 16 to drive the motor 6. The rotation shaft 7 then rotates and causes the first gear 34 to rotate together with the rotation shaft 7 and the intermediate shaft 36 to rotate at the reduced speed via the second gear 57. Therefore, the rotation of the third gear 68 of the clutch gear 62 is transmitted to the tool holder 35 via the fourth gear 40.

When the tool holder 35 rotates, the input shaft 204 of the adapter 200 also rotates at the same time and causes the planetary gear 226 to move in a planetary motion in the internal gear 225 in the reducer 216. Therefore, the output shaft 217 rotates at the reduced speed together with the carrier 227, and it becomes possible to tighten screws using the screwdriver bit B1.

As the screw tightening progresses and the torque increases, the torque applied to the input shaft 204 exceeds the pressing force of the internal gear 225 by each coil spring 238 set in the torque adjuster 218, that is, the torque setting value. Then, each ball 235 pushes up the washer 236 forward against the biasing force of each coil spring 238 and overcomes each engagement protrusion 228, causing the internal gear 225 to rotate freely. Consequently, the rotation transmission by the reducer 216 is cut off, and the rotation of the output shaft 217 stops. The torque setting value can be adjusted by rotating the adjustment sleeve 240 to move the screw ring 239 with a screw-feed motion in the axial direction and changing the axial length of each coil spring 238.

Thus, the adapter 200 includes the mounting portion 201 that includes the mounting cylinder 203 mountable to the hammer drill 1A and the input shaft 204 that is provided in the mounting cylinder 203 and mountable to the tool holder 35.

The adapter 200 also includes the output portion 202 including the reducer 216, the output shaft 217, and the torque adjuster 218. The reducer 216 is arranged in front of the mounting portion 201 for reducing the rotation of the input shaft 204. The reduced rotation is transmitted to the output shaft 217 and the screwdriver bit B1 is mountable to the output shaft 217. The torque adjuster 218 cuts off the transmission of rotation to the output shaft 217 when the torque applied to the output shaft 217 reaches a predetermined torque setting value.

Therefore, even when the hammer drill 1A does not have a clutch mode, it is possible to perform screw-tightening work by mounting the adapter 200. Therefore, it is possible to perform operations such as forming a pilot hole in a workpiece using the hammer drill mode of the hammer drill 1A, and then fastening the screw by mounting the adapter 200. Accordingly, it is more convenient than using two different power tools of the hammer drill 1A and a screwdriver. It also does not compromise the compactness of the hammer drill 1A itself.

In the adapter, the number and arrangement of the balls in the mounting cylinder, the number of planetary gears in the reducer, and the number of balls and coil springs in the torque adjuster can be increased or decreased as appropriate. The mounting cylinder can also be constructed in a way that does not use balls, for example, by tightening a ring-shaped plate spring with a thumbscrew, as in a side handle.

In the torque adjuster, a coil spring is provided for each ball, but a single coil spring that is externally mounted on the small-diameter cylindrical portion may be inserted between the washer and the pressing ring.

In the torque adjuster, a plurality of balls that press the internal gear may be arranged in the front-rear direction, or pins that extend in the front-rear direction may be used instead of the balls.

The screw ring may be provided to be movable forward and rearward only in the axial direction and formed with a screw portion on its outer circumference in a state where the rotation of the screw ring is restricted with respect to the small-diameter cylindrical portion. In this case, when a female screw thread engaged with the screw portion of the screw ring is provided on an inner circumference of the adjusting sleeve, the screw ring can be moved with a screw-feed motion in the front-rear direction by rotating the adjusting sleeve.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A hammer drill comprising:

a motor;

a cylindrical tool holder that is configured to hold a tip tool at a front end thereof, includes a striking portion of the tip tool housed therein, is movable forward and rearward and rotatable coaxially with a strike axis line of the striking portion, and is biased to protrude forward;

an intermediate shaft arranged parallel to the tool holder, rotation of the motor being transmitted to the intermediate shaft, the intermediate shaft transmitting the rotation to the tool holder;

a rotation conversion portion that is disposed on the intermediate shaft and converts the rotation of the intermediate shaft into a striking motion of the striking portion;

a mode switching member that moves forward and rearward together with the tool holder, causes the rotation conversion portion to be inactive in an advance position of the tool holder, and causes the rotation conversion portion to be active in a retreated position of the tool holder;

a restricting member configured to restrict a retreat of the mode switching member in the advance position of the tool holder; and an operation member configured to switch the restricting member between a first switch state in which the restricting member does not restrict the retreat of the mode switching member and a second switch state in which the restricting member restricts the retreat of the mode switching member, wherein the first switch state of the restricting member by the operation member causes the first operation mode in which the rotation of the tool holder and the striking motion of the striking portion are allowed to be performed simultaneously in conjunction with the retreat of the tool holder to the retreated position, and the second switch state of the restricting member by the operation member causes the second operation mode in which the retreat of the tool holder from the advance position is restricted and the tool holder is allowed to be rotated only, and the restricting member is arranged behind the mode switching member in a direction of the strike axis line, the restricting member is provided with a plurality of restricting portions that contact the mode switching member to restrict the retreat of the mode switching member, and the at least one of the plurality of restricting portions is positioned in each of two regions mutually opposed with respect to the strike axis line.

2. The hammer drill according to claim 1, wherein the restricting portions are two restricting portions on left and right of the strike axis line.

3. The hammer drill according to claim 1, wherein the restricting member is configured to move forward and rearward in the direction of the strike axis line, the restricting member retreats in conjunction with the retreat of the mode switching member in the first switch state, and the restricting member moves forward to restrict the retreat of the mode switching member in the second switch state.

4. The hammer drill according to claim 3, further comprising a cam mechanism that allows the retreat of the restricting member in the first switch state and causes the restricting member to move forward in the second switch state.

5. The hammer drill according to claim 4, wherein the cam mechanism includes a biasing member biasing the tool holder forward.

6. The hammer drill according to claim 5, wherein the cam mechanism includes a front cam that is arranged behind the restricting member and configured to move forward and rearward, and a rear cam that is arranged behind the front cam and changes a posture thereof between a first posture that allows the front cam to retreat in response to operation of the operation member and a second posture that restricts the front cam from retreating at a front, and the biasing member is a conical spring provided between the front cam and the rear cam and biases the restricting member and the mode switching member forward together with the front cam.

7. The hammer drill according to claim 6, further comprising an inner housing held inside the body housing that forms an outer housing, wherein the inner housing houses the restricting member, the operation member, and the cam mechanism, wherein a guide recess is formed on an inner surface of the inner housing, and the guide recess fits with the restricting portion to guide a forward and rearward movement of the restricting member.

8. The hammer drill according to claim 7, wherein the front cam engages with the guide recess, and the forward and rearward movement of the front cam is guided by the guide recess.

9. The hammer drill according to claim 8, further comprising a cylinder member fixed to a front surface of the inner housing, the cylinder member including a bearing that holds a rear end of the tool holder, wherein the restricting member passes through the cylinder member in front of the guide recess.

10. The hammer drill according to claim 7, wherein the operation member includes a disc portion and a lever, the disc portion is connected to the rear cam and rotatably fits into a rear portion of the inner housing, and the lever protrudes from the disc portion in a radial direction outward and protrudes from a rear surface of the body housing, and a loop-shaped grip portion disposed across the lever is formed on the rear surface of the body housing.

11. The hammer drill according to claim 4, wherein the restricting member, the cam mechanism, and the operation member are arranged on the strike axis line.

12. The hammer drill according to claim 1, wherein the restricting member is provided with a strike protection member that suppresses the rotation conversion portion from operating in the second operation mode.

13. The hammer drill according to claim 12, wherein the striking portion includes a piston cylinder housed in the tool holder from rear and allowed to move forward and rearward, and a striking member housed in the piston cylinder and linked to the forward and rearward movement of the piston cylinder, the rotation conversion portion includes a conversion member and a rod, the conversion member is externally mount on the intermediate shaft and is rotatable together with the intermediate shaft by switching to active by the mode switching member, and the rod is connected to a rear end of the piston cylinder and oscillates forward and rearward in conjunction with a rotation of the conversion member, and the strike protection member restricts the oscillation of the rod by the rear end of the piston cylinder retreated together with the rod contacting the strike protection member.

14. The hammer drill according to claim 12, wherein the strike protection member is integrally molded with the restricting member.

* * * * *